United States Patent
Kurotobi et al.

(10) Patent No.: US 9,865,162 B2
(45) Date of Patent: Jan. 9, 2018

(54) CONTROL METHOD FOR TRAVELING APPARATUS AND TRAVELING CONTROL APPARATUS

(71) Applicant: Nissan Motor Co., Ltd., Yokohama-shi, Kanagawa (JP)

(72) Inventors: Tomoko Kurotobi, Kanagawa (JP); Abdelaziz Khiat, Kanagawa (JP); Susumu Fujita, Kanagawa (JP); Hikaru Nishira, Kanagawa (JP)

(73) Assignee: Nissan Motor Co., Ltd., Yokohama-Shi, Kanagawa (JP)

( * ) Notice: Subject to any disclaimer, the term of this patent is extended or adjusted under 35 U.S.C. 154(b) by 0 days.

(21) Appl. No.: 15/206,436

(22) Filed: Jul. 11, 2016

(65) Prior Publication Data

US 2017/0018177 A1    Jan. 19, 2017

(30) Foreign Application Priority Data

Jul. 15, 2015   (JP) .................................. 2015-141045

(51) Int. Cl.
| | |
|---|---|
| *G08G 1/01* | (2006.01) |
| *G08G 1/04* | (2006.01) |
| *G08G 1/16* | (2006.01) |

(52) U.S. Cl.
CPC ............. *G08G 1/0145* (2013.01); *G08G 1/04* (2013.01); *G08G 1/161* (2013.01)

(58) Field of Classification Search
CPC ......... G08G 1/0145; G08G 1/161; G08G 1/04

USPC ......................................................... 701/117
See application file for complete search history.

(56) References Cited

U.S. PATENT DOCUMENTS 5,777,564 A * 7/1998 Jones ..................... G08G 1/08
340/907

FOREIGN PATENT DOCUMENTS

JP          2010-026618 A   *   2/2010

* cited by examiner

*Primary Examiner* — Brian P Sweeney
(74) *Attorney, Agent, or Firm* — Young Basile Hanlon & MacFarlane, P.C.

(57) ABSTRACT

A control method allows an own vehicle to proceed through a specific intersection into which vehicles are permitted to proceed in the order that the vehicles arrive. The method includes setting a determination region within a lane other than a lane in which the own vehicle travels; determining whether the own vehicle reaches a certain position at the near side of the specific intersection; allocating a priority state to the determination region when the own vehicle reaches the certain position and allocating a non-priority state to the determination region in which the vehicle does not exist when the own vehicle reaches the certain position; changing the priority state of the determination region to the non-priority state when the vehicle no longer exists in the determination region; and allowing the own vehicle to proceed into the specific intersection when the determination region of the priority state is not present.

14 Claims, 18 Drawing Sheets

CONTROL METHOD FOR TRAVELING APPARATUS AND TRAVELING CONTROL APPARATUS

CROSS-REFERENCE TO RELATED APPLICATION

This application claims priority under 35 U.S.C. §119 to Japanese Patent Application No. 2015-141045 filed on Jul. 15, 2015, the contents of which are incorporated herein by reference in their entirety.

TECHNICAL FIELD

The present invention relates to a control method for a traveling apparatus that controls traveling of a vehicle and also to a traveling control apparatus.

BACKGROUND

In association with a specific intersection into which vehicles are permitted to proceed in the order that the vehicles arrive at the intersection, a below technique is heretofore known (JP2010-26618A). In this technique, when a vehicle proceeds into the specific intersection, an in-vehicle camera of the vehicle is used to capture images of other vehicles which are also proceeding into the specific intersection. Positions of the other vehicles are detected from the captured images and then used to give priority in ascending order of the distance from the detected positions of the other vehicles to the specific intersection. After another vehicle of higher priority than the own vehicle proceeds through the specific intersection, the own vehicle is allowed to proceed into the specific intersection.

In the above conventional technique, vehicles are prioritized on the basis of the distances from the vehicles to the specific intersection. It is therefore required to highly accurately detect the position of another vehicle on the basis of the captured image and accurately calculate the distance from the position of another vehicle to the specific intersection.

However, if the resolution of camera is low or if another vehicle is far from the own vehicle, the position of another vehicle cannot be highly accurately detected on the basis of the captured image. It may be difficult to appropriately prioritize the vehicles which are proceeding into the specific intersection.

An object of the present invention is to provide a control method for a traveling apparatus and a traveling control apparatus which allows a vehicle to appropriately travel through a specific intersection into which vehicles are permitted to proceed in the order that the vehicles arrive at the intersection.

SUMMARY

According to an aspect of the present invention, the above object can be achieved by providing a control method for a traveling apparatus. The control method includes detecting a specific intersection. The specific intersection is an intersection into which vehicles are permitted to proceed in the order that the vehicles arrive at the intersection. The control method includes setting a determination region within a lane other than a lane in which the own vehicle travels. The determination regions are set at the near side when proceeding into the specific intersection. The control method further includes allocating a priority state to the determination region in which the vehicle exists when the own vehicle reaches the certain position and allocating a non-priority state to the determination region in which the vehicle does not exist when the own vehicle reaches the certain position. The control method includes changing the priority state of the determination region to the non-priority state when the vehicle no longer exists in the determination region and allowing the own vehicle to proceed into the specific intersection when the determination region of the priority state is not present.

According to the present invention, whether or not to allow a vehicle to proceed into a specific intersection is determined on the basis of the occupancy state of a determination region by another vehicle. Therefore, whether or not to allow a vehicle to proceed into a specific intersection can be appropriately determined even when some error occurs in the detected position of another vehicle.

DESCRIPTION OF THE EMBODIMENTS

Hereinafter, embodiments of the present invention will be described with reference to the drawings. In these embodiments, a traveling control apparatus (a traveling apparatus for a vehicle) to be installed in a vehicle will be exemplified for explaining the present invention.

<<First Embodiment>>

Traveling control apparatus 100 according to the present embodiment searches a specific intersection on a route on which the own vehicle is to travel (such a route will be referred to as a "planned traveling route"). The specific intersection is an intersection into which vehicles are permitted to proceed in the order that the vehicles arrive at the intersection (details will be described later). When a specific intersection is present on the planned traveling route, the traveling control apparatus 100 sets determination regions within lanes other than the own lane. The determination regions are regions at the near side when proceeding into the specific intersection. The traveling control apparatus 100 allocates a priority state to a determination region in which another vehicle exists when the own vehicle reaches a certain position at the near side of the specific intersection and also allocates a non-priority state to a determination region in which another vehicle does not exist when the own vehicle reaches the certain position. In addition, the traveling control apparatus 100 changes the priority state of a determination region to the non-priority state when another vehicle travels away from the determination region. The traveling control apparatus 100 then allows the own vehicle to proceed into the specific intersection when a determination region of the priority state is not present.

Figure 1:
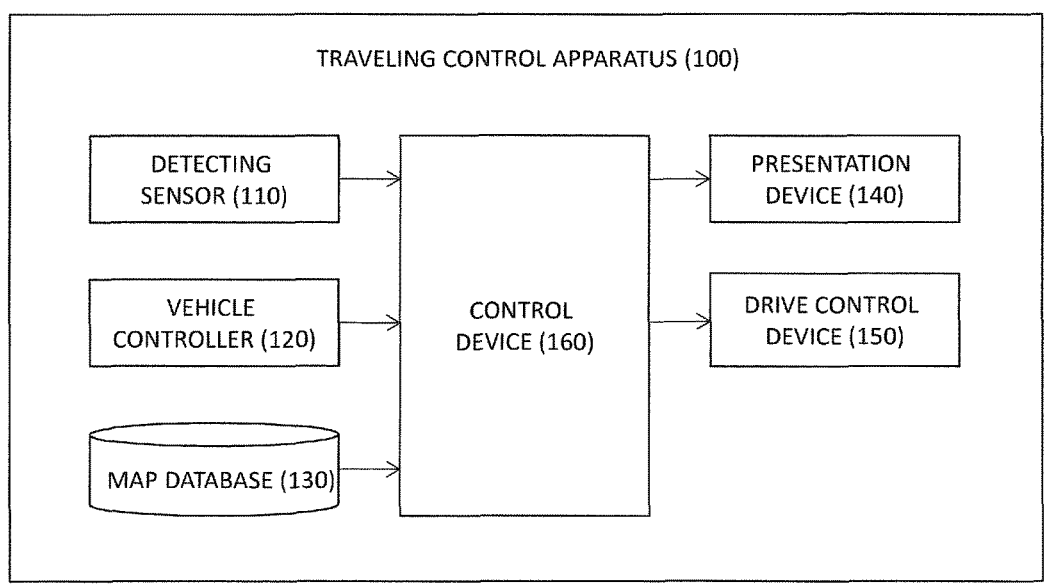
FIG. 1 is a block diagram illustrating the configuration of a traveling control apparatus according to an embodiment of the present invention.

FIG. 1 is a block diagram illustrating the configuration of the traveling control apparatus 100 according to the present embodiment. As illustrated in FIG. 1, the traveling control apparatus 100 has an ambient detecting sensor 110, vehicle controller 120, map database 130, presentation device 140, drive control device 150, and control device 160. These components are connected via a CAN (Controller Area Network) or other in-vehicle LAN to exchange information with one another.

The ambient detecting sensor 110 is a sensor that detects a situation around the own vehicle. Examples of the ambient detecting sensor 110 include a forward camera which captures forward images from the own vehicle, a rearward camera which captures rearward images from the own vehicle, a frontward radar which detects obstacles located ahead the own vehicle, a rearward radar which detects obstacles located behind the own vehicle, and a sideward radar which detects obstacles located at the side of the own vehicle. The ambient detecting sensor 110 may be configured to use one of the above sensors or may also be configured to use a combination of two or more sensors. The detection results of the ambient detecting sensor 110 are output to the control device 160.

The vehicle controller 120 acquires detection results from sensors as own vehicle information. The sensors detect a traveling state of the own vehicle and may be a vehicle speed sensor, GPS unit, gyroscopic sensor, and the like. For example, the vehicle controller 120 acquires vehicle speed data of the own vehicle detected by a vehicle speed sensor as the own vehicle information. Alternatively or in addition, the vehicle controller 120 may acquire positional data of the own vehicle detected by a GPS unit as the own vehicle information. Alternatively or in addition, the vehicle controller 120 may acquire acceleration data and/or angular speed data of the own vehicle detected by a gyroscopic sensor as the own vehicle information. The own vehicle information acquired by the vehicle controller 120 is output to the control device 160.

The map database 130 stores map information which includes road information and intersection information. The road information includes those of lanes which constitute each road, the traveling direction in each lane, presence or absence of a pedestrian crossing, and the position of a stop line near an intersection. The intersection information includes those associated with the type of an intersection (information as to whether the intersection is a specific intersection). The specific intersection refers to an intersection which may be called a 4-way stop, 3-way stop or the like, such as in North America, and which has no traffic signals in general. Instead, drivers follow a traffic rule with which vehicles approaching a specific intersection come to a stop before proceeding into the specific intersection and are then permitted to proceed through the specific intersection in the order that the vehicles arrive at the specific intersection.

The presentation device 140 is a device for presentation and may, for example, be a display of a navigation device, a display incorporated in a rearview mirror, a display incorporated in an instrument panel, a headup display projected onto a windshield, or a speaker of an audio device. The presentation device 140 presents some information to the driver under the control by the control device 160.

The drive control device 150 controls traveling of the own vehicle. For example, the drive control device 150 has following capability which allows the own vehicle to automatically follow a vehicle ahead. In this case, the drive control device 150 controls the operation of a drive mechanism (which includes the operation of an internal-combustion engine in an engine car and the operation of an electric motor in an electric vehicle system and may further include the torque ratio of an internal-combustion engine and an electric motor in a hybrid car) and the braking operation for achieving the acceleration, the deceleration and vehicle speed that are required for the following distance to be constant between the own vehicle and a vehicle ahead. In addition, the drive control device 150 may have a lane keeping function that allows the own vehicle to automatically travel so that the vehicle does not drift out of the lane, and a function that allows the own vehicle to automatically overtake another vehicle and steer right or left at an intersection. In this case, the drive control device 150 controls the operation of a steering actuator to control the operation of the wheels thereby to perform the steering control of the own vehicle. The drive control device 150 controls traveling of the own vehicle in accordance with the commands from the control device 160, which will be described later. Other well-known methods may also be employed in the drive control device 150 to realize the method for traveling control.

The control device 160 may be configured to include a ROM (Read Only Memory) that stores program to control traveling of the own vehicle, a CPU (Central Processing Unit) that executes the program stored in the ROM, and a RAM (Random Access Memory) that functions as an accessible storage. As substitute for or in addition to the CPU as an operational circuit, an MPU (Micro Processing Unit), DSP (Digital Signal Processor), ASIC (Application Specific Integrated Circuit), and/or FPGA (Field Programmable Gate Array) can be used.

The control device 160 uses the CPU to execute the program stored in the ROM thereby to achieve an own vehicle information acquisition function, ambient information acquisition function, route searching function, specific intersection detection function, own vehicle arrival determination function, determination region setting function, priority state allocating function, priority state changing function, and right-of-way determination function. Each function of the control device 160 will be described below.

The control device 160 uses the own vehicle information acquisition function to acquire information regarding the traveling state of the own vehicle as the own vehicle information. For example, the own vehicle information acquisition function operates to acquire, as the own vehicle information, the position, vehicle speed, acceleration, angular speed and other necessary information of the own vehicle which are acquired by the vehicle controller 120. In addition, the own vehicle information acquisition function can also operate to acquire the information of destination, which may be set manually by a driver or automatically set, as the own vehicle information.

The control device 160 uses the ambient information acquisition function to acquire ambient information, which represents the situation around the own vehicle, from the ambient detecting sensor 110. For example, the ambient information acquisition function can operate to acquire, as the ambient information, image data of outside of the vehicle from the forward camera and rearward camera of the ambient detecting sensor 110 and detection data of outside of the vehicle from the frontward radar, rearward radar and sideward radar of the ambient detecting sensor 110. In an embodiment, the ambient information acquisition function may operate to analyze the detection data acquired from the ambient detecting sensor 110 to detect a moving object which exists around the own vehicle. In this case, the ambient information acquisition function can further operate to acquire information, which includes the detected position, traveling direction and speed of the moving object, as the ambient information.

The control device 160 uses the route searching function to search a planned traveling route for the own vehicle from the current position of the own vehicle to the destination. The method of searching the planned traveling route by the route searching function is not particularly limited, and any known method can be employed.

The control device 160 uses the specific intersection detection function to detect a specific intersection located on the planned traveling route for the own vehicle on the basis of the map information stored in the map database 130 and/or the ambient information acquired by the ambient information acquisition function. For example, the specific intersection detection function can operate to refer to the intersection information included in the map information thereby to detect a specific intersection located on the planned traveling route for the own vehicle. In an embodiment, the specific intersection detection function may operate to detect a sign that indicates a specific intersection, using the forward images from the own vehicle captured by the forward camera of the ambient detecting sensor 110. In this case, the intersection located ahead the own vehicle can be detected as a specific intersection.

Figure 2:
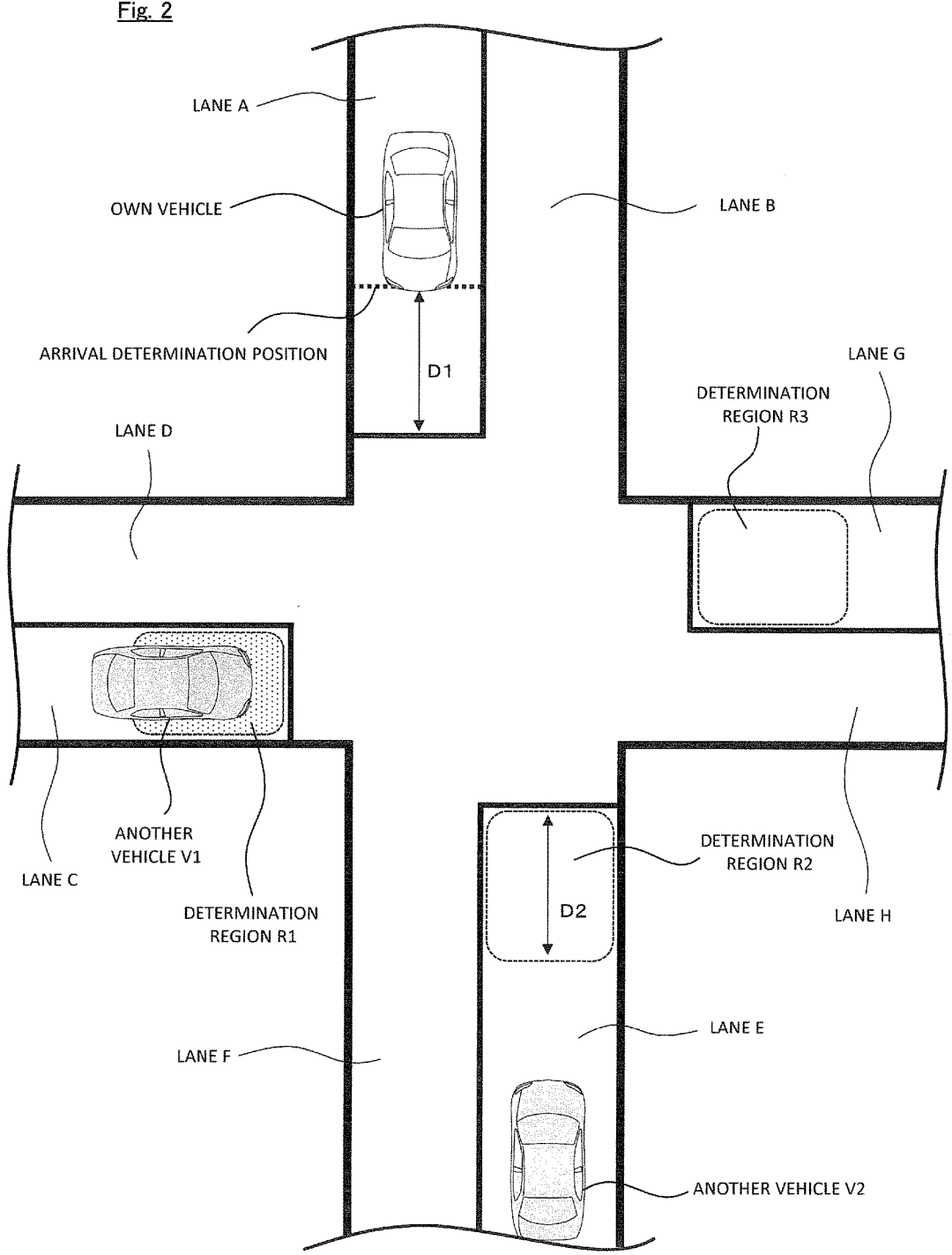
FIG. 2 is a view exemplifying a scene in which the own vehicle is proceeding into a specific intersection.

The control device 160 uses the determination region setting function to set determination regions within lanes other than a lane in which the own vehicle travels. As illustrated in FIG. 2, the determination regions are set at the near side when proceeding into a specific intersection. FIG. 2 is a view exemplifying a scene in which the own vehicle is proceeding into the specific intersection. In the example illustrated in FIG. 2, for example, eight lanes A to H are connected to the specific intersection. Among the lanes A to H, lanes in which vehicles can be proceeding into the specific intersection are four lanes, i.e. lanes A, C, E, and G. The determination region setting function operates to set determination regions within three lanes C, E, and G other than the lane A in which the own vehicle is traveling. For each of the lanes C, E, and G in which another vehicle can be proceeding into the specific intersection as illustrated in FIG. 2, the determination region setting function operates to set a determination region that is a region at the near side when another vehicle proceeds into the specific intersection (e.g. a region at the near side from the specific intersection by a predetermined distance).

Figure 3A:
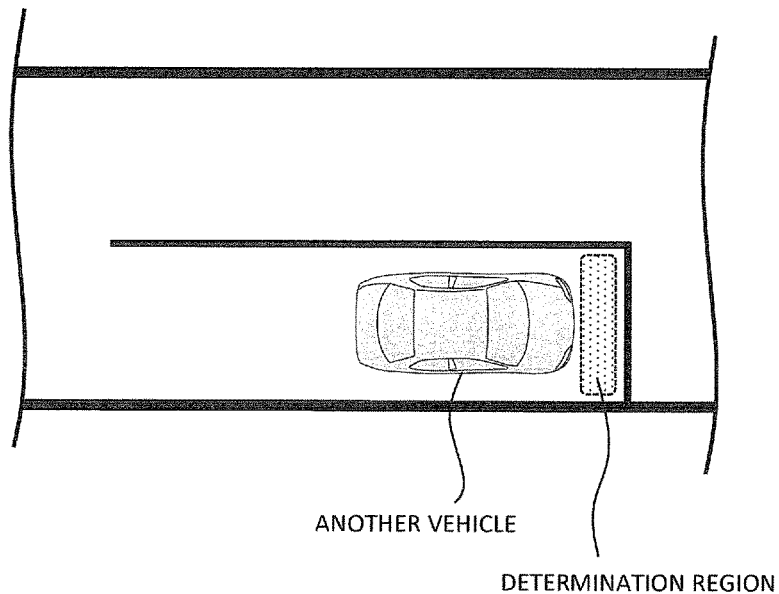
FIGS. 3(A) and 3(B) are views for explaining a method of setting a determination region.
Figure 3B:
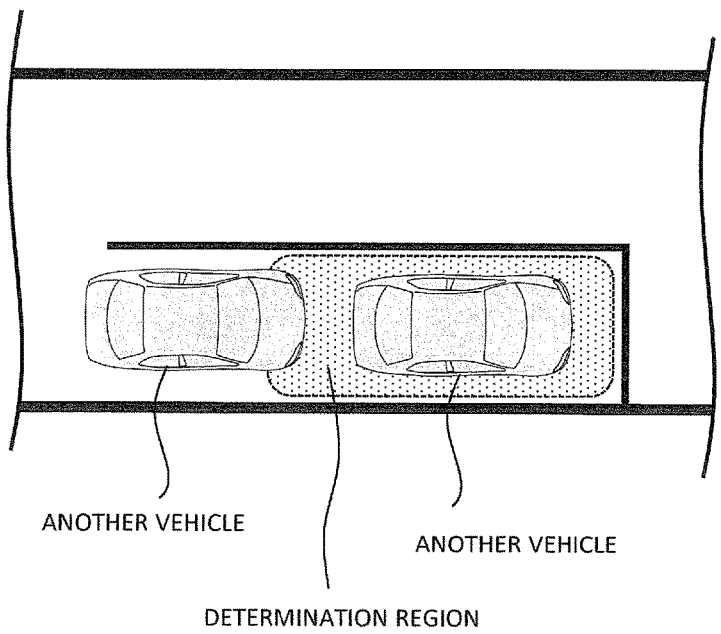

The size of the determination regions is not particularly limited, but may preferably be such that, as illustrated in FIG. 2, the length of the determination regions in the vehicle traveling direction is not shorter than half the length of a typical vehicle and not longer than the length of a typical vehicle. For example, if, as illustrated in FIG. 3(A), the length of a determination region in the traveling direction is shorter than half the length of a vehicle, another vehicle that arrives earlier may not be detect because some drivers may stop their vehicles behind or beyond the stop line. On the other hand, if the length of a determination region in the traveling direction is longer than the length of a vehicle as illustrated in FIG. 3(B), a second another vehicle that arrives at the determination region later than the own vehicle is also present within the determination region, so that the second another vehicle may be detected to exist in the determination region even after the first another vehicle travels away from the determination region. Therefore, again, it is preferred that the length of the determination regions in the vehicle traveling direction is not shorter than half the length of a typical vehicle and not longer than the length of a typical vehicle.

The control device 160 uses the own vehicle arrival determination function to determine whether the own vehicle reaches a position at the near side of the specific intersection. Specifically, to determine whether the own vehicle reaches a position at the near side of the specific intersection, the own vehicle arrival determination function operates to set an arrival determination position in the lane in which the own vehicle is traveling, as illustrated in FIG. 2. The arrival determination position is a position at the near side of the specific intersection by a predetermined distance. More specifically, the own vehicle arrival determination function operates to set the arrival determination position, as illustrated in FIG. 2, at a position at which the distance D1 from a stop line of the specific intersection to the arrival determination position is approximately the same as the distance D2 from a stop line of the specific intersection to a position at which a vehicle arrives at the determination region. In an alternative embodiment, in consideration of the detection error of the ambient detecting sensor 110, the own vehicle arrival determination function may operate to set the arrival determination position at a position at which the distance D1 is shorter than the distance D2. In another alternative embodiment, although not illustrated, the arrival determination position may be set at a position at which the distance D3 from the center of the specific intersection to the arrival determination position is approximately the same as the distance D4 from the center of the specific intersection to a position at which a vehicle arrives at the determination region. In any case, the own vehicle arrival determination function operates to determine that the own vehicle reaches a position at the near side of the specific intersection when the own vehicle reaches the arrival determination position, as illustrated in FIG. 2.

The control device 160 uses the priority state allocating function to allocate a priority state to a determination region in which another vehicle exists when the own vehicle reaches a position at the near side of the specific intersection. In the present embodiment, after the determination region setting function operates to set the determination regions, the priority state allocating function operates to set a default configuration in which the priority state is allocated to all of the determination regions. The priority state allocating function then operates to update the priority state of the default configuration to a non-priority state in a determination region in which another vehicle does not exist when the own vehicle reaches a position at the near side of the specific intersection. The priority state allocating function can thus allocate the priority state to a determination region in which another vehicle exists when the own vehicle reaches a position at the near side of the specific intersection and can also allocate the non-priority state to a determination region in which another vehicle does not exist when the own vehicle reaches a position at the near side of the specific intersection.

Figure 4:
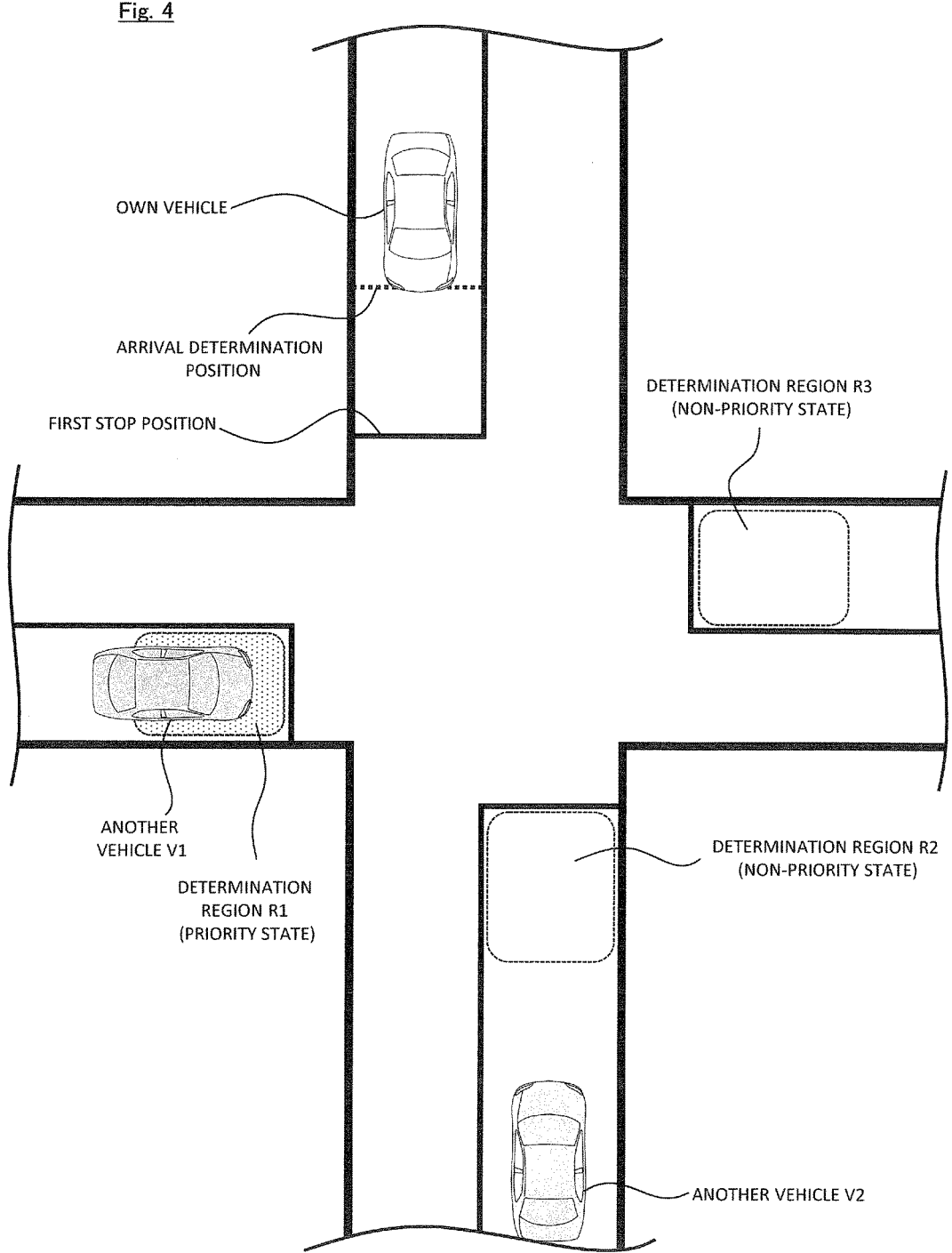
FIG. 4 is a view for explaining a method of allocating a priority state and a non-priority state to determination regions in the scene illustrated in FIG. 2.

In the example illustrated in FIG. 2, for example, another vehicle V1 and still another vehicle V2 are approaching the specific intersection. In this example, the vehicle V1 has arrived at the specific intersection prior to the own vehicle, and the vehicle V2 is to arrive at the specific intersection later than the own vehicle. When the determination regions are denoted by R1 to R3, the vehicle V1 exists in the determination region R1 whereas no vehicles exist in the determination regions R2 and R3. Accordingly, the priority state allocating function operates to allocate the priority state to the determination region R1 and allocate the non-priority state to the determination regions R2 and R3, as illustrated in FIG. 4. FIG. 4 is a view for explaining a method of allocating the priority state and non-priority state to the determination regions in the exemplary scene illustrated in FIG. 2.

Figure 5:
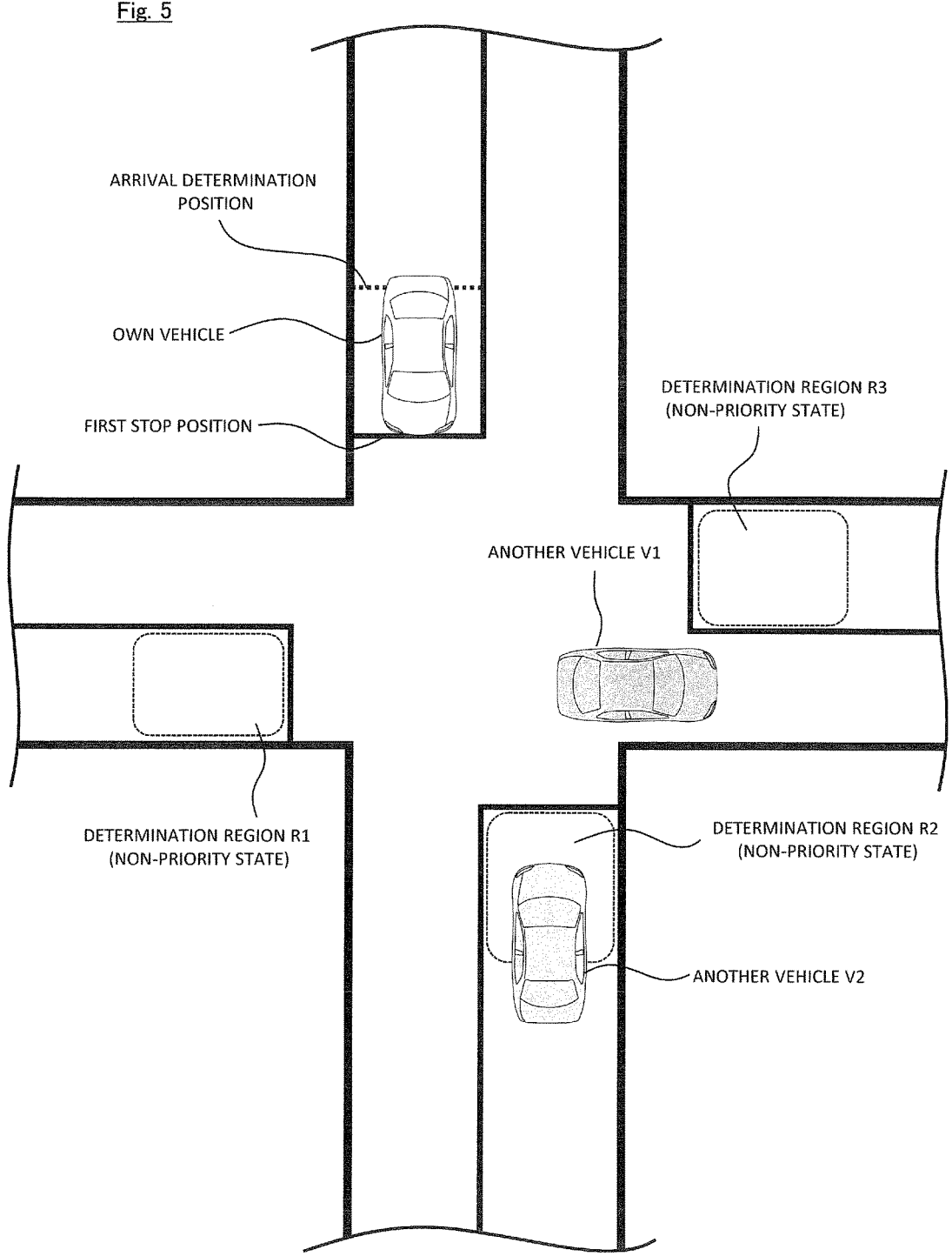
FIG. 5 is a view for exemplifying a scene in which another vehicle has traveled away from a determination region of the priority state in the scene illustrated in FIG. 2.

The control device 160 uses the priority state changing function to change the priority state of a determination region to the non-priority state when another vehicle travels away from the determination region so that another vehicle no longer exists in the determination region of the priority state. FIG. 5 is a view for exemplifying a scene in which another vehicle has traveled away from a determination region of the priority state in the exemplary scene illustrated in FIG. 2. In the example illustrated in FIG. 5, the vehicle V1 has already traveled away from the determination region R1 of the priority state and another vehicle no longer exists in the determination region R1. Therefore, the priority state changing function operates to change the priority state of the determination region R1 to the non-priority state, as illustrated in FIG. 5.

In the example illustrated in FIG. 5, the vehicle V2 moves into the determination region R2. In contrast to the above, however, the priority state changing function does not operate to change the non-priority state of the determination region R2 to the priority state, as illustrated in FIG. 5, even when another vehicle exists in the determination region R2 of the non-priority state. That is, the priority state changing function operates to maintain the non-priority state of a determination region so that the non-priority state still remain even after the determination region comes to a state in which another vehicle exists therein. This is because the vehicle existing in the determination region of the non-priority state arrives later than the own vehicle, and the own vehicle has a priority to proceed through the specific intersection.

The control device 160 uses the right-of-way determination function to determine the right-of-way to proceed into the specific intersection, i.e. whether to allow the own vehicle to proceed into the specific intersection. Specifically, the right-of-way determination function operates to prohibit the own vehicle from proceeding into the specific intersection when a determination region of the priority state is present and allow the own vehicle to proceed into the specific intersection when all of the determination regions are in the non-priority state. For example, in the scene illustrated in FIG. 4, the right-of-way determination function operates to prohibit the own vehicle from proceeding into the specific intersection because the determination region R1 is in the priority state. On the other hand, in the scene illustrated in FIG. 5, the right-of-way determination function operates to allow the own vehicle to proceed into the specific intersection because all of the determination regions R1 to R3 are in the non-priority state.

Figure 6:
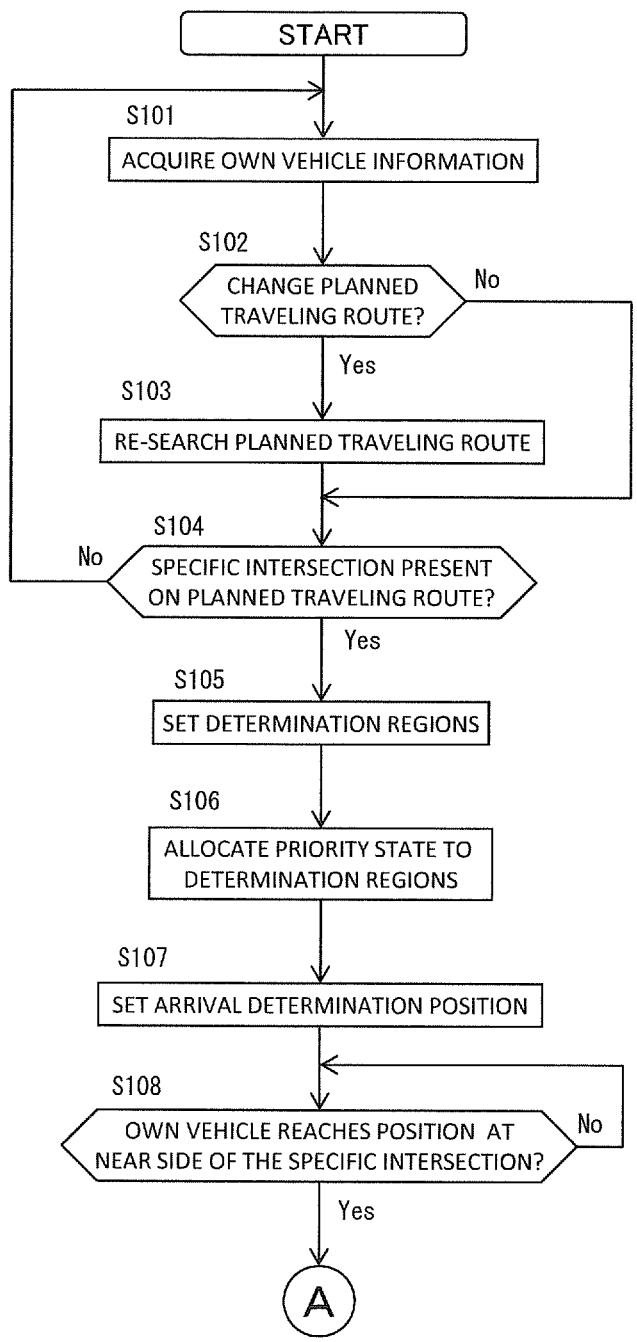
FIG. 6 is a flowchart (part 1) illustrating a traveling control process according to a first embodiment of the present invention.
Figure 7:
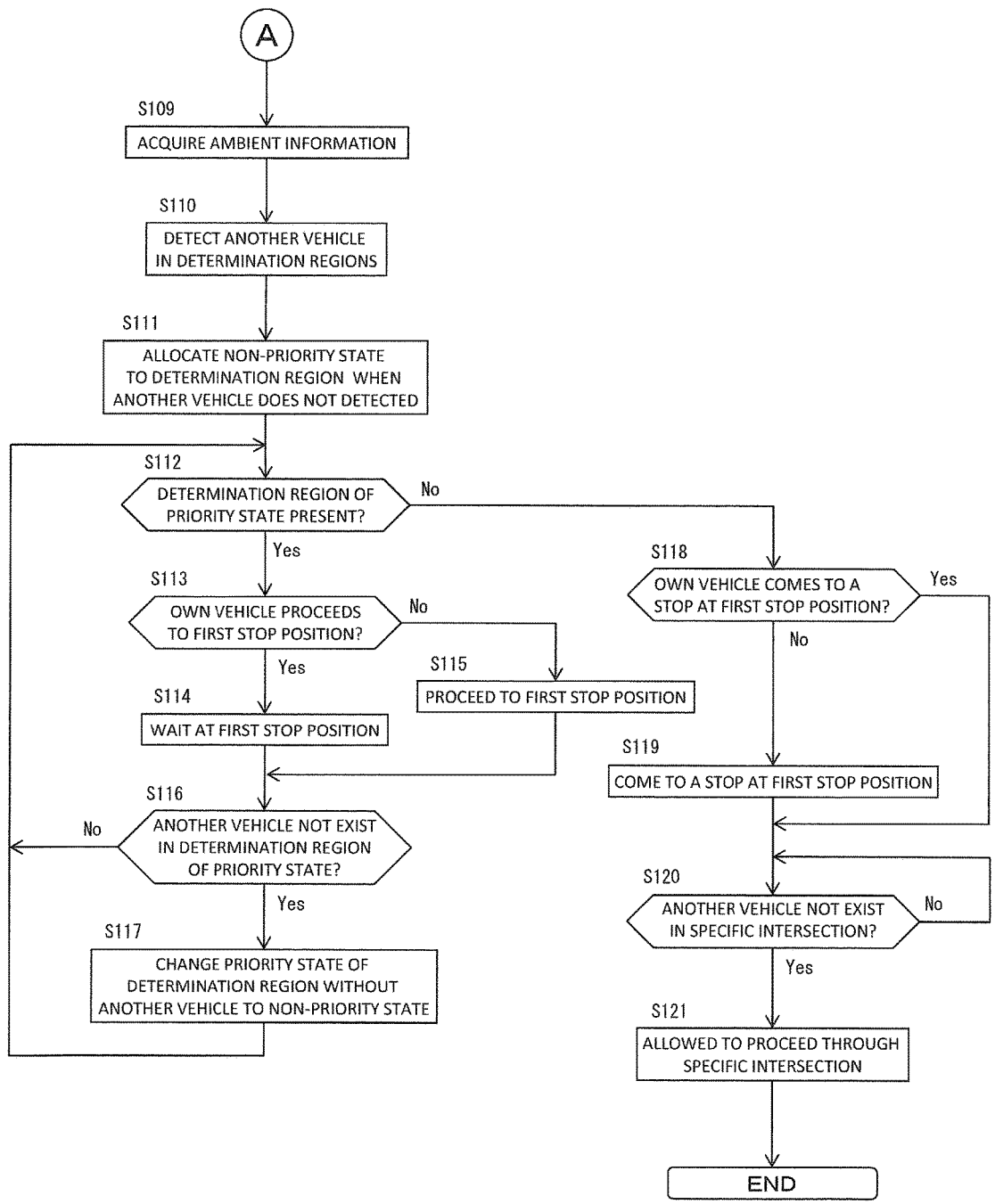
FIG. 7 is a flowchart (part 2) illustrating the traveling control process according to the first embodiment of the present invention.

A traveling control process according to the first embodiment will now be described with reference to FIGS. 6 and 7. FIGS. 6 and 7 represent a flowchart that illustrates the traveling control process according to the first embodiment. The traveling control process described below is executed by the control device 160.

As illustrated in step S101 of FIG. 6, the own vehicle information acquisition function operates first to acquire the own vehicle information which includes the positional information of the own vehicle. The own vehicle information acquisition function may also operate to identify the lane in which the own vehicle is traveling, on the basis of the positional information of the own vehicle and the map information, for example, and acquire the information of the lane as the own vehicle information.

Step S101 is followed by step S102 in which the route searching function operates to determine whether to change the planned traveling route. For example, if the current position of the own vehicle as acquired in step S101 deviates from the planned traveling route which was preliminarily set, the route searching function operates to determine to change the planned traveling route, and the process proceeds to step S103. If, on the other hand, the current position of the own vehicle is on the planned traveling route, the route searching function operates to determine not to change the planned traveling route, and the process jumps to step S104 without performing the process of step S103. When the lane in which the own vehicle is traveling is identified, the route searching function may operate to determine whether the lane is a lane that allows the own vehicle to travel on the planned traveling route. If the own vehicle is not traveling in a lane that allows the own vehicle to travel on the planned traveling route, the route searching function can determine to change the planned traveling route.

In step S103, the route searching function operates to search the planned traveling route from the current position of the own vehicle to the destination on the basis of the positional information of the own vehicle acquired in step S101. The route searching function may search the planned traveling route not only on the basis of the road on which the own vehicle is traveling, but also on the basis of the lane in which the own vehicle is traveling. For example, the route searching function can operate to determine the planned traveling route for the own vehicle at a lane level by an approach using a graph search algorithm, such as Dijkstra's algorithm and A* search algorithm. In the present embodiment, the map database 130 stores the map information which includes, for example, information of links and nodes of each lane. The links are preliminarily weighted in accordance with the traveling distance, road situation, etc. of each lane (for example, the weighting of links increases as the distance increases or the road situation deteriorates). The route searching function operates to identify a lane that is suitable for the traveling route to the destination and correct the weighting of links of the identified lane. For example, when right turn is required to arrive at the destination, the weighting of links of the right turn lane can be corrected to be reduced. The route searching function can operate to search a planned traveling route that is a route at a lane level in which the total sum of weighting of links is minimum in the lane from the current position of the own vehicle to the destination, using a graph search algorithm, such as Dijkstra's algorithm and A* search algorithm.

Step S103 is followed by step S104 in which the specific intersection detection function operates to determine whether a specific intersection is present on the planned traveling route for the own vehicle determined in step S103. The specific intersection is an intersection into which vehicles are permitted to proceed in the order that the vehicles arrive at the intersection. If a specific intersection is not present on the planned traveling route for the own vehicle, the process returns to step S101. If a specific intersection is present on the planned traveling route for the own vehicle, the process proceeds to step S105.

In step S105, the determination region setting function operates to set determination regions within lanes other than a lane in which the own vehicle travels. As illustrated in FIG. 2, the determination regions are set with reference to positions at the near side of the specific intersection by a predetermined distance. Step S105 is followed by step S106 in which the priority state allocating function operates to set a default configuration such that the priority state is allocated to all of the determination regions set in step S105.

Step S106 is followed by step S107 in which, as illustrated in FIG. 2, the own vehicle arrival determination function operates to set an arrival determination position that is a position at the near side of the specific intersection by a predetermined distance. Step S107 is followed by step S108 in which the own vehicle arrival determination function operates to determine whether the own vehicle reaches a position at the near side of the specific intersection. If the own vehicle does not reach the arrival determination position set in step S107, the own vehicle arrival determination function determines that the own vehicle does not reach a position at the near side of the specific intersection, and the process waits in step S108. If the own vehicle reaches the arrival determination position, the own vehicle arrival determination function determines that the own vehicle reaches a position at the near side of the specific intersection, and the process proceeds to step S109 of FIG. 7.

In step S109, the ambient information acquisition function operates to acquire the ambient information which represents the situation around the own vehicle. Step S109 is followed by step S110 in which the priority state allocating function operates to detect another vehicle within the determination regions set in step S106, on the basis of the ambient information acquired in step S109.

Step S110 is followed by step S111 in which the priority state allocating function operates to allocate the non-priority state to a determination region in which another vehicle is not detected as a result of the detection of another vehicle in step S110. That is, in the present embodiment, while the default configuration is set in step S106 such that the priority state is allocated to all of the determination regions, the priority state of a determination region in which another vehicle is not detected is changed to the non-priority state in this step S110.

Step S111 is followed by step S112 in which the right-of-way determination function operates to determine whether a determination region of the priority state is present. If a determination region of the priority state is not present, i.e., all of the determination regions are in the non-priority state, the process proceeds to step S118. If a determination region of the priority state is present, the process proceeds to step S113.

Steps S113 to S117 represent a process when a determination region of the priority state is present. When one or more determination regions of the priority state are present, the own vehicle is caused to first proceed to a first stop position and then wait at the first stop position until the determination regions of the priority state are no longer present (i.e. until another vehicle or the all other vehicles existing in the one or more determination regions of the priority state proceed into the specific intersection). The first stop position as used herein refers to a position at which the own vehicle comes to a stop before proceeding into the specific intersection. For example, as illustrated in FIG. 4, a stop line of the specific intersection can be set as the first stop position. In an alternative embodiment, the first stop position may be set at a farther position from the specific intersection than the stop line. The process of steps S113 to S117 will be specifically described below.

In step S113, the right-of-way determination function operates to determine whether the own vehicle proceeds to the first stop position. If the own vehicle is determined not to proceed to the first stop position, the process proceeds to step S115 in which the right-of-way determination function performs traveling control so as to cause the own vehicle to proceed to the first stop position. If the own vehicle is determined to proceed to the first stop position in step S113, the process proceeds to step S114 in which the right-of-way determination function operates to cause the own vehicle to wait (come to a stop) at the first stop position. In the example illustrated in FIG. 4, for example, the process proceeds to step S115 in which the own vehicle is caused to proceed to the first stop position because the own vehicle has not yet proceed to the first stop position.

Steps S114 and S115 are followed by step S116 in which the priority state changing function operates to detect again the situation around the own vehicle and it is determined whether another vehicle no longer exists in a determination region of the priority state. If another vehicle no longer exists in a determination region of the priority state, the process proceeds to step S117 in which the priority state changing function operates to change the priority state of the determination region to the non-priority state. In the example illustrated in FIG. 5, for example, the vehicle V1, which waited in the determination region R1 of the priority state, proceeds into the specific intersection, so that another vehicle no longer exists in the determination region R1 of the priority state. Therefore, the priority state of the determination region R1 is changed to the non-priority state. If another vehicle exists in a determination region of the priority state, the process returns to step S112 without performing the process of step S117.

When a determination region of the priority state is present and another vehicle exists in the determination region, the priority state changing function operates to repeat detection of another vehicle in the determination region thereby to monitor the determination region until another vehicle no longer exists in the determination region (repeat steps S112 to S116). In this case, it may be preferred that the priority state changing function operates to detect another vehicle only in a determination region of the priority state rather than also in a determination region of the non-priority state. This allows reduction in the processing load when monitoring whether another vehicle exists in a determination region of the priority state.

Referring again to the determination step of S 112, if it is determined that a determination region of the priority state is not present, the process proceeds to step S118. Steps S118 to S121 represent a process when a determination region of the priority state is not present. When a determination region of the priority state is not present, the traveling control is performed such that the own vehicle is brought to a stop at the first stop position and thereafter allowed to proceed into the specific intersection.

More specifically, in step S118, the right-of-way determination function operates to determine whether the own vehicle comes to a stop at the first stop position. If the own vehicle does not come to a stop at the first stop position, the process proceeds to step S119 in which the own vehicle is brought to a stop at the first stop position, and then proceeds to step S 120. If, in step S118, the own vehicle is determined to come to a stop at the first stop position, the process proceeds to step S120 without performing the process of step S119. In the example illustrated in FIG. 5, for example, the process proceeds to step S120 because the own vehicle comes to a stop at the first stop position.

In step S120, the right-of-way determination function operates to determine whether another vehicle does not exist in the specific intersection. For example, the right-of-way determination function can make this determination on the basis of the detection results from the ambient detecting sensor 110. If another vehicle exists in the specific intersection, the process waits in step S120. That is, the own vehicle remains at the first stop position. If another vehicle does not exist in the specific intersection, the process proceeds to step S121 in which the drive control device 150 performs traveling control to allow the own vehicle to proceed through the specific intersection.

As described above, the traveling control apparatus 100 according to the first embodiment determines whether the own vehicle is allowed to proceed through a specific intersection, into which vehicles are permitted to proceed in the order that the vehicles arrive at the specific intersection, on the basis of the occupancy state of a determination region by another vehicle. This allows an appropriate determination as to which vehicle has a priority to proceed through the specific intersection even when some error occurs in the detection of positions of other vehicles. Therefore, whether or not to allow the own vehicle to proceed into a specific intersection can be appropriately determined.

In addition, according to the first embodiment, when a determination region of the priority state is present, the own vehicle is brought to a stop at the first stop position located at the near side of the specific intersection. Through this operation, when a determination region of the priority state is present, i.e., when another vehicle which arrive at the specific intersection prior to the own vehicle waits at a position at the near side of the specific intersection, the own vehicle is not allowed to proceed into the specific intersection. Therefore, whether or not to allow the own vehicle to proceed into a specific intersection can be appropriately determined in accordance with the traffic rule of the specific intersection.

Moreover, according to the first embodiment, when a determination region of the priority state is not present, the own vehicle is brought to a stop at the first stop position located at the near side of the specific intersection and thereafter allowed to proceed into the specific intersection. The traffic rule of a specific intersection requires vehicles to come to a stop before proceeding through the specific intersection. Owing to the above operation of the first embodiment, whether or not to allow the own vehicle to proceed into a specific intersection can be appropriately determined in accordance with the traffic rule of the specific intersection.

In addition, according to the first embodiment, when another vehicle existed in a determination region of the priority state, but thereafter the vehicle travels away from the determination region, so that another vehicle no longer exists in the determination region, the priority state of the determination region is changed to the non-priority state. Through this operation, even when, after another vehicle travels away from a determination region of the priority state, a second another vehicle arrives at the determination region later than the own vehicle, the second another vehicle can effectively be prevented from being erroneously prioritized to the own vehicle.

Furthermore, according to the first embodiment, the length of the determination regions in the vehicle traveling direction is set to a length that is not longer than the length of a vehicle. This provides an advantageous effect as follows. If the length of a determination region in the traveling direction is longer than the length of a vehicle as illustrated in FIG. 3(B), a second another vehicle that arrives at the determination region later than the own vehicle may be erroneously prioritized to the own vehicle. In contrast, according to the above operation of the first embodiment, the second another vehicle can effectively be prevented from being erroneously prioritized to the own vehicle.

In addition, according to the first embodiment, the arrival determination position is set at a position at which the distance D1 from the stop line to the arrival determination position is approximately the same as the distance D2 from the stop line to a position at which a vehicle arrives at the determination region. This allows an appropriate determination of the order that vehicles arrive at the specific intersection.

<<Second Embodiment>>

A traveling control apparatus 100 according to a second embodiment of the present invention will be described. The traveling control apparatus 100 has the same configuration as that in the first embodiment except that it operates as follows.

Figure 8:
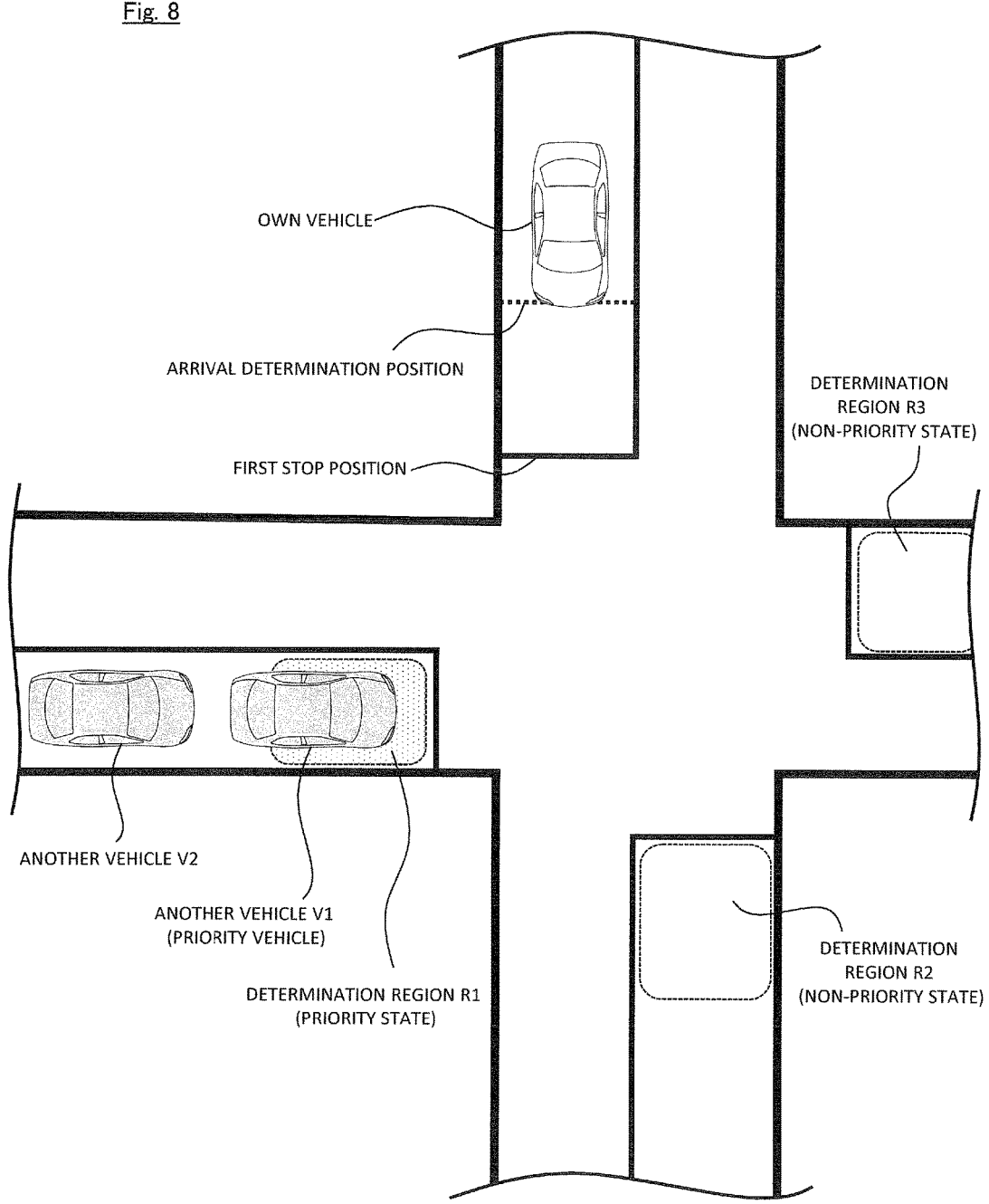
FIG. 8 is a view for exemplifying a scene in which other vehicles are successively proceeding into a specific intersection.

In the second embodiment, the priority state changing function of the control device 160 operates to detect another vehicle existing in a determination region of the priority state as a priority vehicle, as illustrated in FIG. 8. The priority state changing function further operates to continuously monitor whether the priority vehicle travels away from the determination region of the priority state. FIG. 8 is a view for exemplifying a scene in which other vehicles are successively proceeding into the specific intersection. In the example illustrated in FIG. 8, another vehicle V1 and still another vehicle V2 are successively approaching the specific intersection. The vehicle V1 has arrived at the specific intersection prior to the own vehicle, and the vehicle V2 is to arrive at the specific intersection later than the own vehicle.

Figure 9:
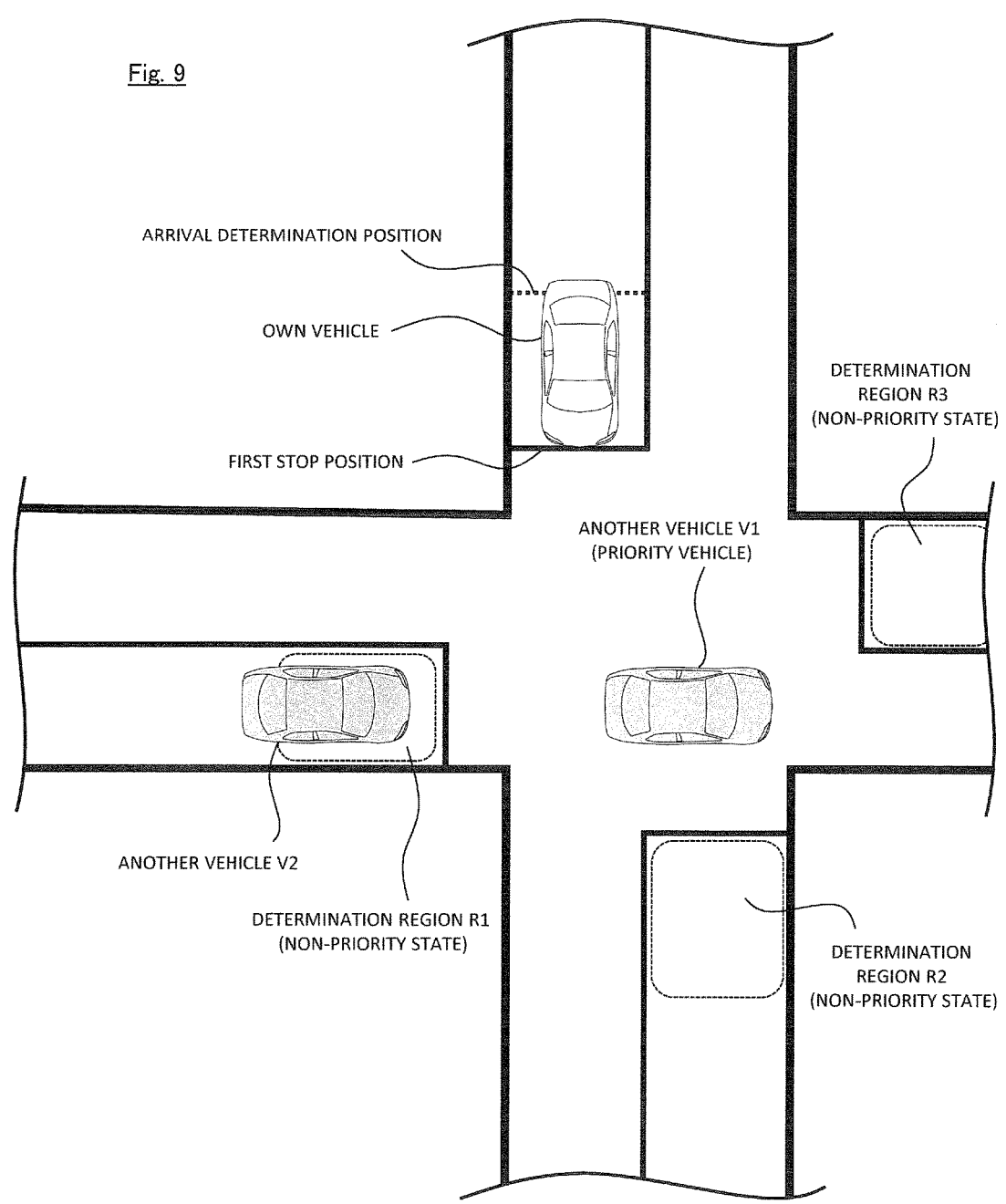
FIG. 9 is a view for exemplifying a scene in which a priority vehicle has traveled away from a determination region of the priority state in the exemplary scene illustrated in FIG. 8.

FIG. 9 is a view for exemplifying a scene in which the priority vehicle V1 has traveled away from the determination region R1 of the priority state in the exemplary scene illustrated in FIG. 8. As illustrated in FIG. 9, when the priority vehicle V1 travels away from the determination region R1 of the priority state, the priority state changing function operates to change the priority state of the determination region R1 to the non-priority state. This operation provides an advantageous effect as follows. If, immediately after the priority vehicle V1 travels away from the determination region R1 of the priority state, another vehicle V2 following the priority vehicle V1 enters the determination region R1, for example, as illustrated in FIG. 9, the determination region R1 may still remain in the priority state because the vehicle V2 exists in the determination region R1. In contrast, the above operation of the present embodiment can prevent the determination region R1 from remaining in the priority state.

Figure 10:
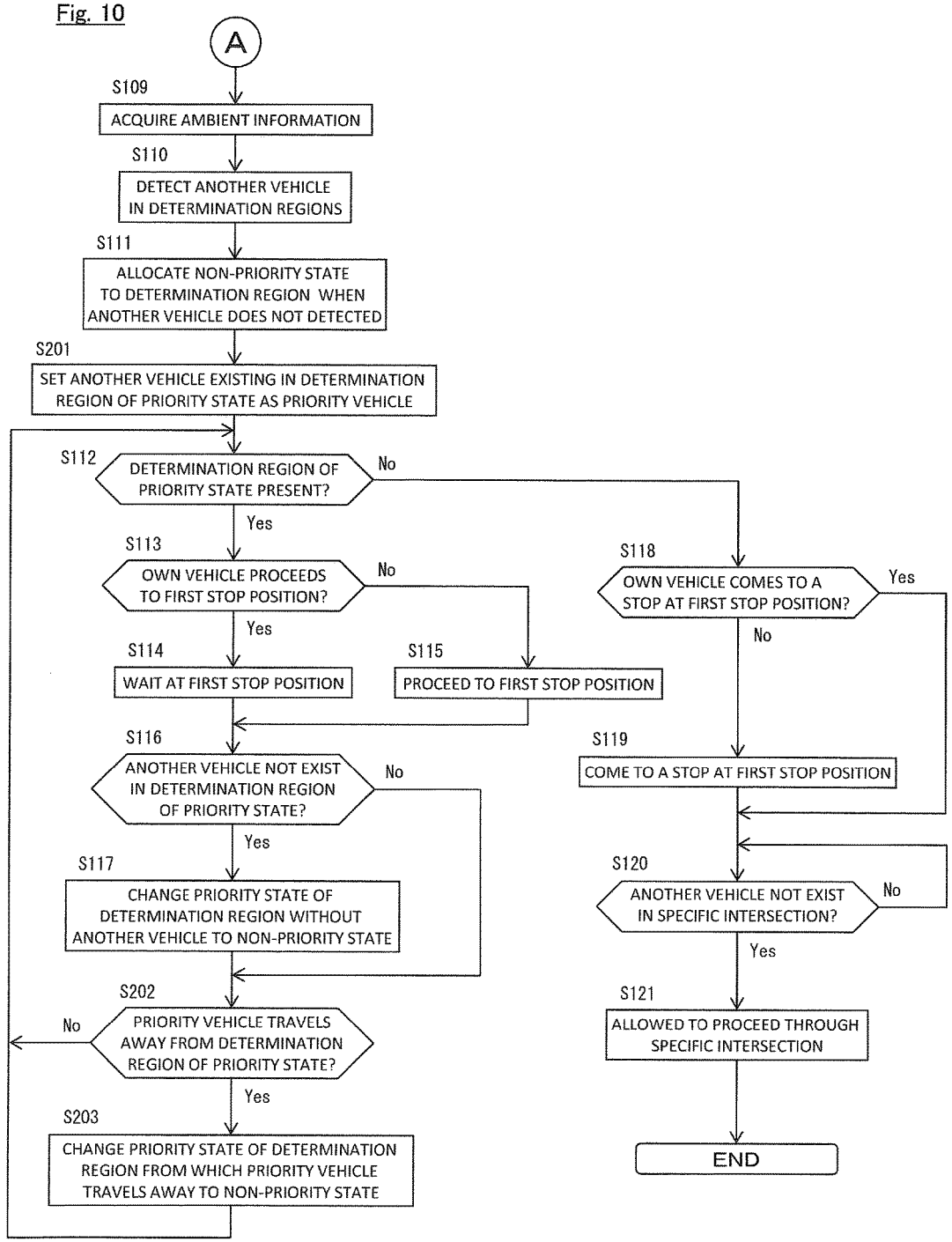
FIG. 10 is a flowchart illustrating a traveling control process according to a second embodiment of the present invention.

A traveling control process according to the second embodiment will then be described with reference to FIG. 10. FIG. 10 is a flowchart that illustrates the traveling control process according to the second embodiment. In the second embodiment, the process illustrated in FIG. 6 is performed as in the first embodiment, but the process illustrated in FIG. 7 of the first embodiment is substituted by a process illustrated in FIG. 10. The process of step S201 and subsequent steps in FIG. 10 will be described below.

After the non-priority state is allocated, in step S111, to a determination region in which another vehicle is not detected, the process proceeds to step S201. In step S201, the priority state changing function operates to set another vehicle, which exists in the determination region of the priority state, as a priority vehicle. In the example illustrated in FIG. 8, for example, the priority state changing function operates to set the vehicle V1, which exists in the determination region R1 of the priority state, as a priority vehicle.

In steps S112 to S117, similarly to the first embodiment, if a determination region of the priority state is present (step S112=Yes), the own vehicle is caused to proceed to the first stop position (step S115), and if there is a determination region of the priority state in which another vehicle no longer exists (step S116=Yes), the priority state of the determination region is changed to the non-priority state (step S117). In the exemplary scene illustrated in FIG. 8, the determination region R1 remains in the priority state because the priority vehicle exists in the determination region R1 of the priority state.

Step S117 is followed by step S202 in which the priority state changing function operates to determine whether the priority vehicle travels away from the determination region of the priority state. If the priority vehicle travels away from the determination region of the priority state, the process proceeds to step S203 in which the priority state changing function operates to change the priority state of the determination region to the non-priority state. If the priority vehicle does not travel away from the determination region of the priority state, the determination region remains in the priority state.

Steps S118 to S121 are the same as those in the first embodiment, and the description will be omitted.

As described above, the traveling control apparatus 100 according to the second embodiment identifies another vehicle, which exists in a determination region of the priority state, as a priority vehicle and monitors whether the priority vehicle travels away from the determination region of the priority state. When the priority vehicle travels away from the determination region of the priority state, the priority state of the determination region from which the priority vehicle travels away is changed to the non-priority state. Here, in the scene as illustrated in FIG. 8 in which another vehicle V1 arriving at the specific intersection prior to the own vehicle and still another vehicle V2 arriving at the specific intersection later than the own vehicle exist, the vehicle V2 following the vehicle V1 proceeds into the determination region R1 of the priority state after the vehicle V1 travels away from the determination region R1 as illustrated in FIG. 9. Therefore, if the priority state of the determination region is changed to the non-priority state merely when another vehicle no longer exists in the determination region of the priority state, the vehicle V2 will be determined to exist in the determination region of the priority state, as illustrated in FIG. 9, and the priority state of the determination region R1 may not be appropriately changed to the non-priority state. In contrast, according to the second embodiment, the priority vehicle V1 is monitored, so that the priority state of the determination region R1 can be appropriately changed to the non-priority state even when the vehicles V1 and V2 are successively traveling as illustrated in FIG. 9. Consequently, whether or not to allow the own vehicle to proceed into the specific intersection can be appropriately determined.

<<Third Embodiment>>

A traveling control apparatus 100 according to a third embodiment of the present invention will be described. The traveling control apparatus 100 has the same configuration as that in the second embodiment except that it operates as follows.

Figure 11:
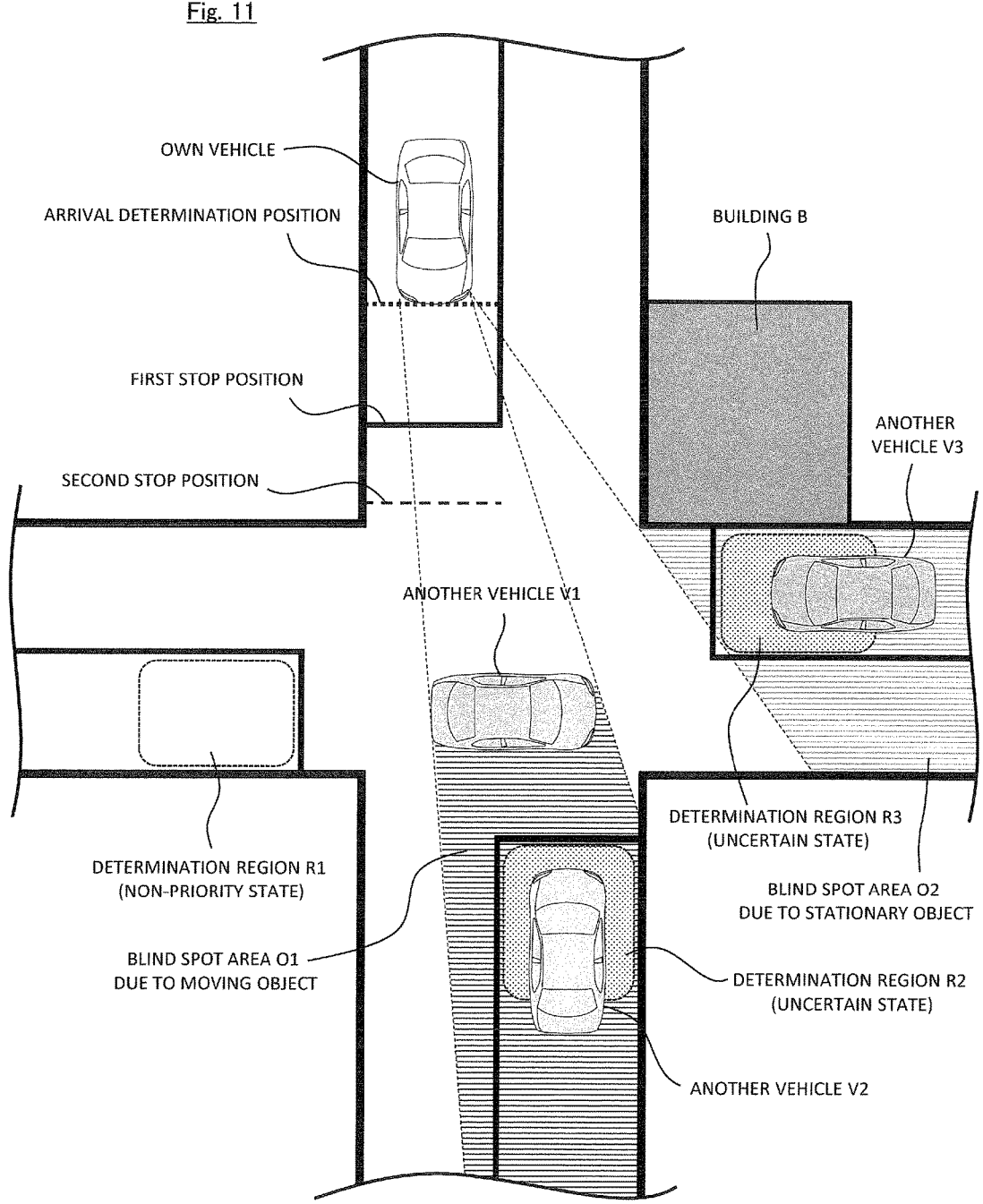
FIG. 11 is a view for exemplifying a scene in which a blind spot area occurs when the own vehicle is proceeding into a specific intersection.

The control device 160 according to the third embodiment further has a blind spot area detection function in addition to the functions of the control device 160 according to the second embodiment. FIG. 11 exemplifies a scene in which blind spot areas O1 and O2 occur when the own vehicle is proceeding into the specific intersection. In the example illustrated in FIG. 11, the blind spot area O1 occurs due to another vehicle V1 as an area behind the vehicle V1, and the blind spot area O2 occurs due to a building B as an area behind the building B. The blind spot area detection function operates to detect the vehicle V1 and building B thereby to detect the blind spot area O1 behind the vehicle V1 and the blind spot area O2 behind the building B.

In addition, the blind spot area detection function operates to determine whether a blind spot area occurs due to a moving object such as a vehicle or due to a stationary object such as a building. For example, upon detection of another vehicle V1 and detection of a blind spot area O1 behind the vehicle V1 as illustrated in FIG. 11, the blind spot area detection function operates to determine the blind spot area O1 as a blind spot area that occurs due to a moving object. On the other hand, upon detection of a building B and detection of a blind spot area O2 behind the building B as illustrated in FIG. 11, the blind spot area detection function operates to determine the blind spot area O2 as a blind spot area that occurs due to a stationary object. Whether the object is a moving object or a stationary object can be determined, for example, by pattern matching of the image data of an object detected in the captured images with sample data of a vehicle, building, etc. This determination can be performed using any other known method.

In the third embodiment, when the determination region is present within a blind spot area, the priority state allocating function operates to allocate an uncertain state to the determination region. In the example illustrated in FIG. 11, for example, the determination region R2 is present within the blind spot area O1 and the determination region R3 is present within the blind spot area O2. Therefore, the priority state allocating function operates to allocate the uncertain state to the determination regions R2 and R3, as illustrated in FIG. 11.

Figure 12:
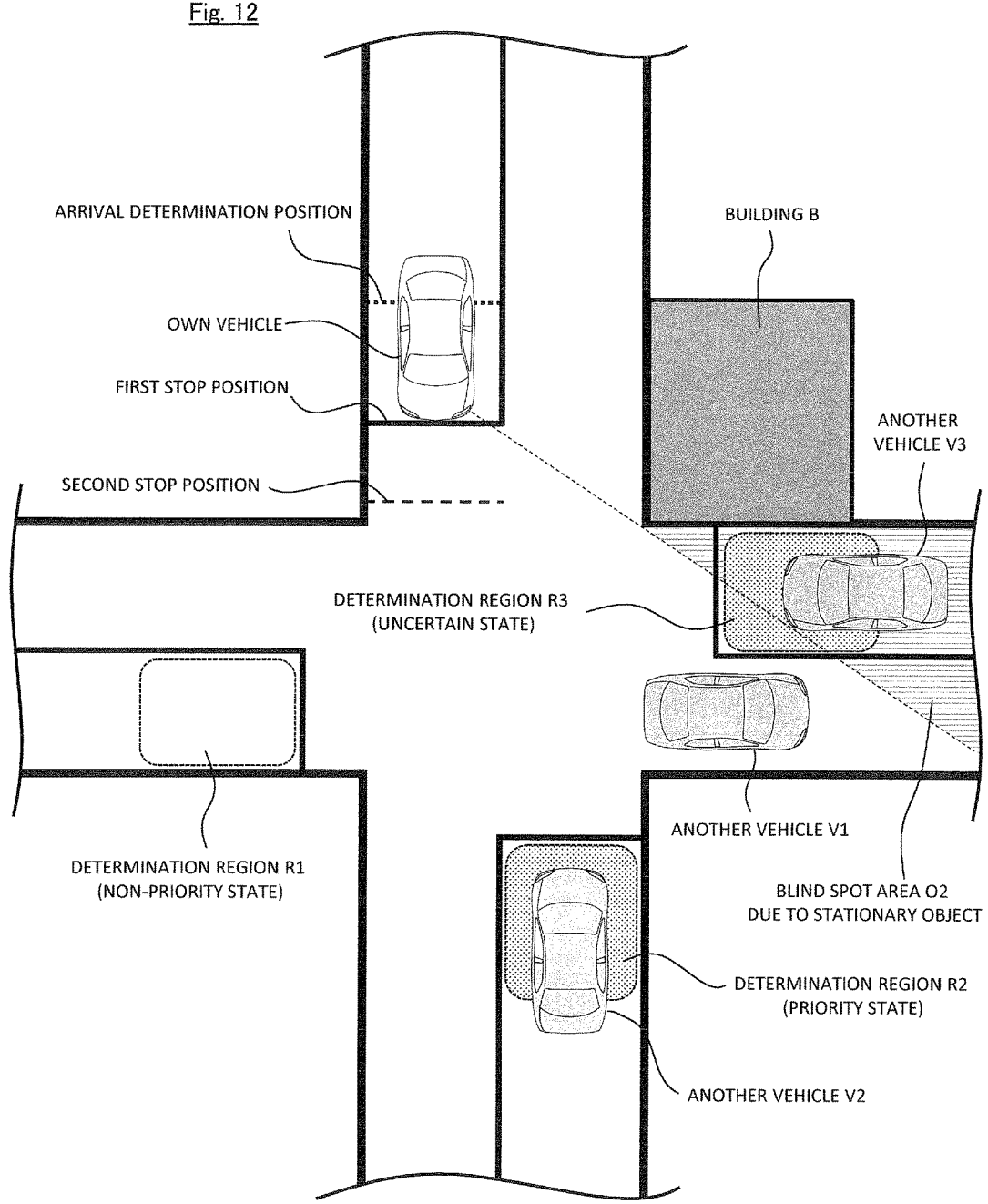
FIG. 12 is a view illustrating a scene in which the blind spot area due to a moving object is eliminated in the exemplary scene illustrated in FIG. 11.
Figure 13:
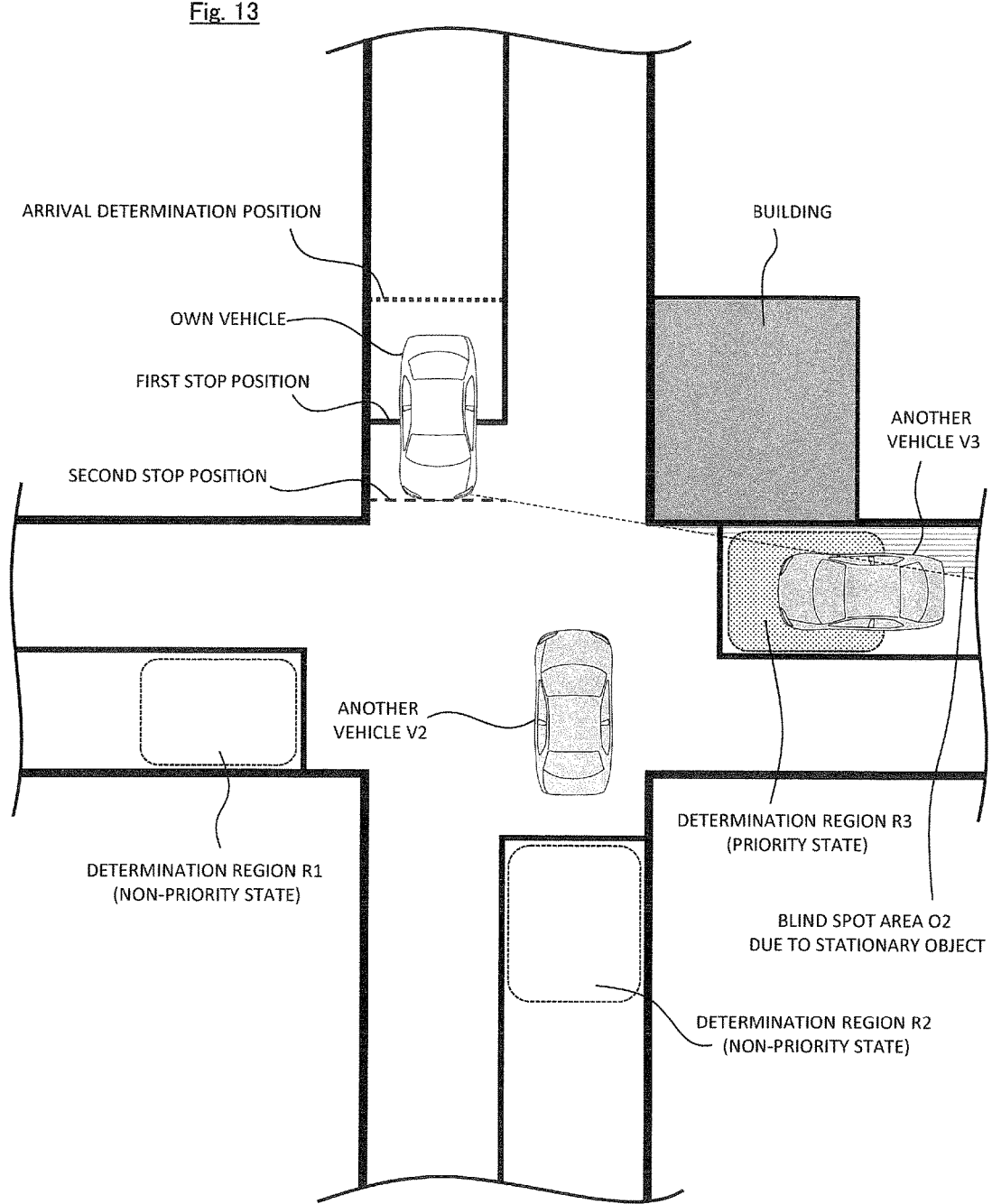
FIG. 13 is a view illustrating a scene in which the blind spot area due to a stationary object is eliminated in the exemplary scene illustrated in FIG. 11.

When a determination region of the uncertain state is present, the priority state changing function operates to control traveling of the own vehicle to determine whether the determination region is in the priority state or in the non-priority state. Specifically, when a determination region is in the uncertain state because the determination region is present within a blind spot area due to a moving object such as another vehicle, the priority state changing function can operate to determine whether the determination region is in the priority state or in the non-priority state by detecting the determination region after the moving object moves away. Therefore, when a determination region is present within a blind spot area due to a moving object, the priority state changing function operates to bring the own vehicle to a stop and wait that the moving object moves away. In the example illustrated in FIG. 11, for example, the determination region R2 is present within the blind spot area O1 due to another vehicle V1. In this case, therefore, the priority state changing function operates to bring the own vehicle to a stop for standby and wait that the vehicle V1 moves away to eliminate the blind spot area O1 due to the vehicle V1. After the vehicle V1 moves away as illustrated in FIG. 12, the priority state changing function can operate to detect another vehicle V2 within the determination region R2. As a result, the priority state changing function operates to change the uncertain state of the determination region R2 to the priority state. Thereafter, when the vehicle V2 travels away from the determination region R2 of the priority state as illustrated in FIG. 13, the priority state changing function operates to change the priority state of the determination region R2 to the non-priority state.

Figure 14:
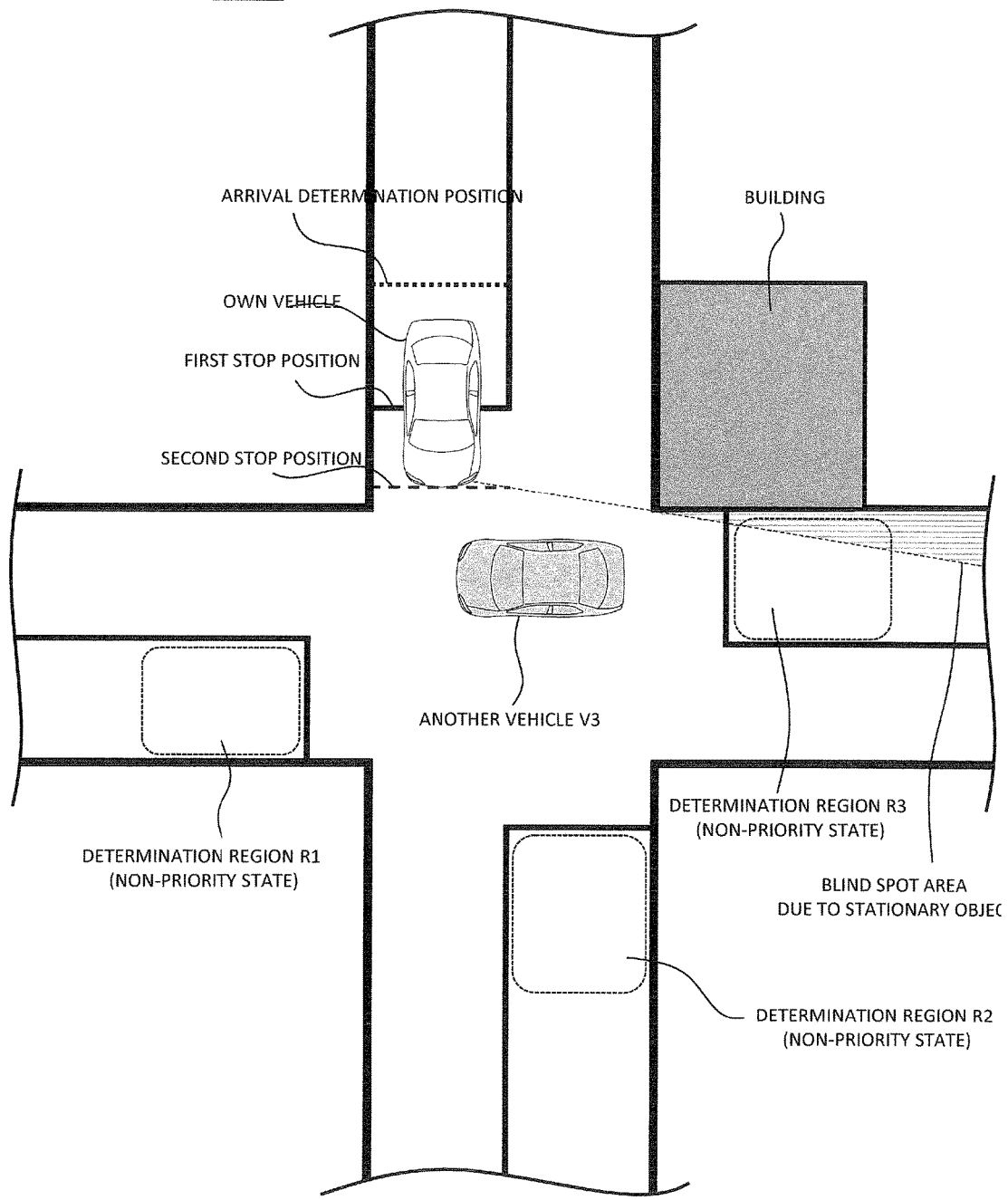
FIG. 14 is a view for exemplifying a scene in which another vehicle has traveled away from a determination region of the priority state in the exemplary scene illustrated in FIG. 11.

When a determination region is in the uncertain state because the determination region is present within a blind spot area due to a stationary object such as building, the priority state changing function performs traveling control to cause the own vehicle to proceed by a certain distance. In the example illustrated in FIG. 11, for example, the determination region R3 is present within the blind spot area O2 due to the building B. In this case, the priority state changing function operates to cause the own vehicle to proceed to a second stop position. The second stop position refers to a position that is separate from the specific intersection by a predetermined distance and set nearer the specific intersection than the first stop position. For example, as illustrated in FIG. 11, the second stop position may be a position just before the specific intersection when the own vehicle proceeds into the specific intersection. As a result of the own vehicle proceeding to the second stop position, the determination region R3 appears from the blind spot area O2 of the building B, as illustrated in FIG. 13, and another vehicle can be detected within the determination region R3. In the example illustrated in FIG. 13, because another vehicle V3 exists in the determination region R3, the priority state changing function operates to change the uncertain state of the determination region R3 to the priority state. Thereafter, when the vehicle V3 travels away from the determination region R3 as illustrated in FIG. 14, the priority state changing function operates to change the priority state of the determination region R3 to the non-priority state. This allows the own vehicle to proceed into the specific intersection because a determination region of the priority state is no longer present. FIGS. 12 to 14 are views illustrating the scenes in which the vehicles V2 and V3 travel away from the determination regions R2 and R3 in the scene illustrated in FIG. 11.

Figure 15:
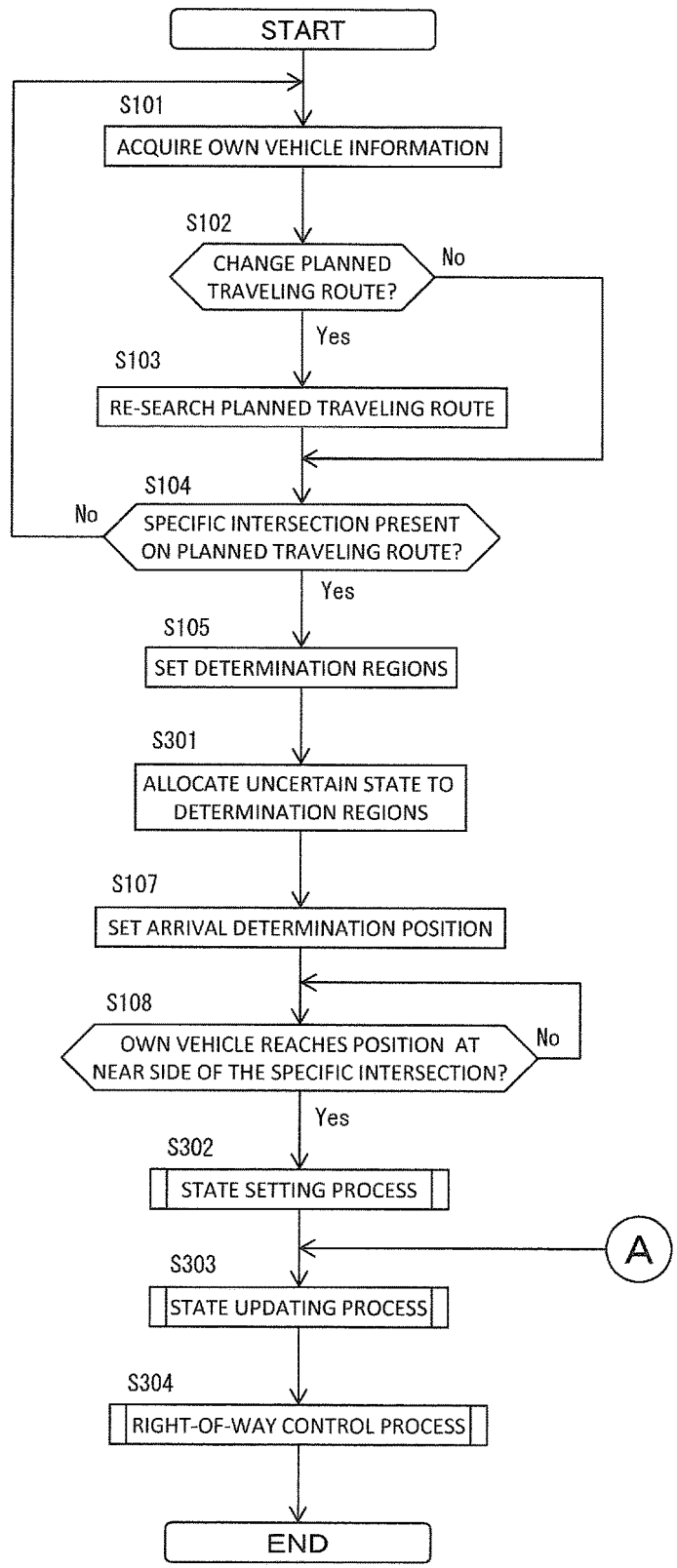
FIG. 15 is a flowchart illustrating a traveling control process according to a third embodiment of the present invention.

A traveling control process according to the third embodiment will then be described with reference to FIG. 15. FIG. 15 is a flowchart that illustrates the traveling control process according to the third embodiment. Steps S101 to S105 are the same as those in the first embodiment, and the description thereof will be omitted.

After determination regions are set in step S105, the process proceeds to step S301. In step S301, the priority state allocating function operates to set a default configuration in which the uncertain state is allocated to all of the determination regions. The arrival determination position is then set (step S107), and it is determined whether the own vehicle reaches the arrival determination position (step S108).

Figure 16:
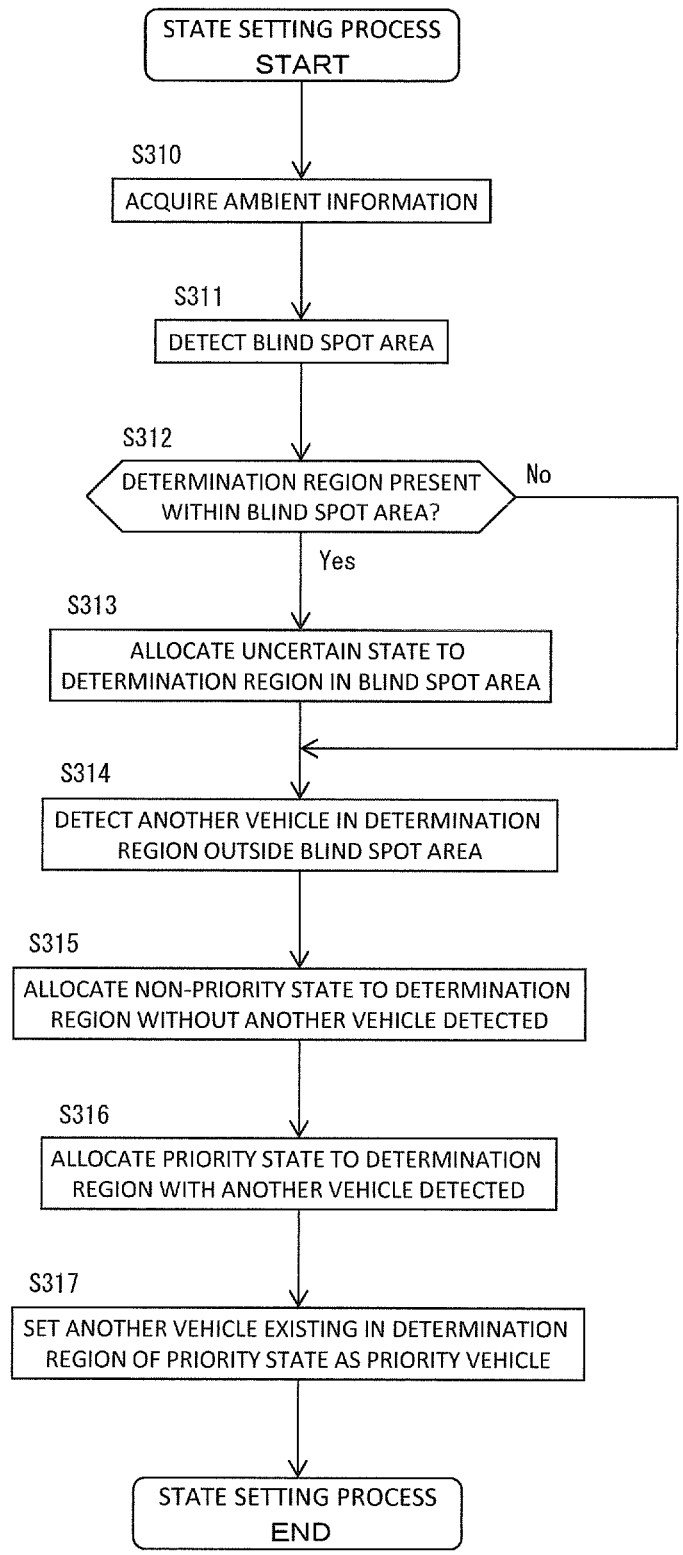
FIG. 16 is a flowchart illustrating a state setting process of step S302.

If, in step S108, the own vehicle is determined to reach a position at the near side of the specific intersection, the process proceeds to a state setting process of step S302, details of which are illustrated in FIG. 16. The state setting process is a process to detect a blind spot area and allocate either of the priority state, non-priority state and uncertain state to each of the determination regions.

In step S310, the ambient information acquisition function operates to first acquire the ambient information. Step S310 is followed by step S311 in which the blind spot area detection function operates to detect a blind spot area on the basis of the ambient information acquired in step S310. The blind spot area detection function operates also to determine whether the detected blind spot area occurs due to a stationary object or due to a moving object. In the example illustrated in FIG. 11, for example, the blind spot area detection function operates to detect another vehicle V1 and a building B thereby to detect a blind spot area O1 behind the vehicle V1 and a blind spot area O2 behind the building B, respectively. In addition, the blind spot area detection function operates to determine that the blind spot area O1 occurs due to a moving object and the blind spot area O2 occurs due to a stationary object.

Step S311 is followed by step S312 in which the priority state allocating function operates to determine whether a determination region is present within the blind spot area detected in step S311. If a determination region is present within the blind spot area, the process proceeds to step S313 in which the priority state allocating function operates to allocate the uncertain state to the determination region present within the blind spot area, and the process then proceeds to step S314. Also if a determination region is not present within the blind spot area, the process proceeds to step S314.

In steps S314 to S316, the priority state changing function operates to: detect another vehicle in a determination region that is not present within a blind spot area (step S314); change the uncertain state of a determination region without another vehicle to the non-priority state (step S315); and change the uncertain state of a determination region with another vehicle to the priority state (step S316). Another vehicle existing in a determination region of the priority state is set as a priority vehicle (step S317). The state setting process of FIG. 16 is thus completed.

Figure 17:
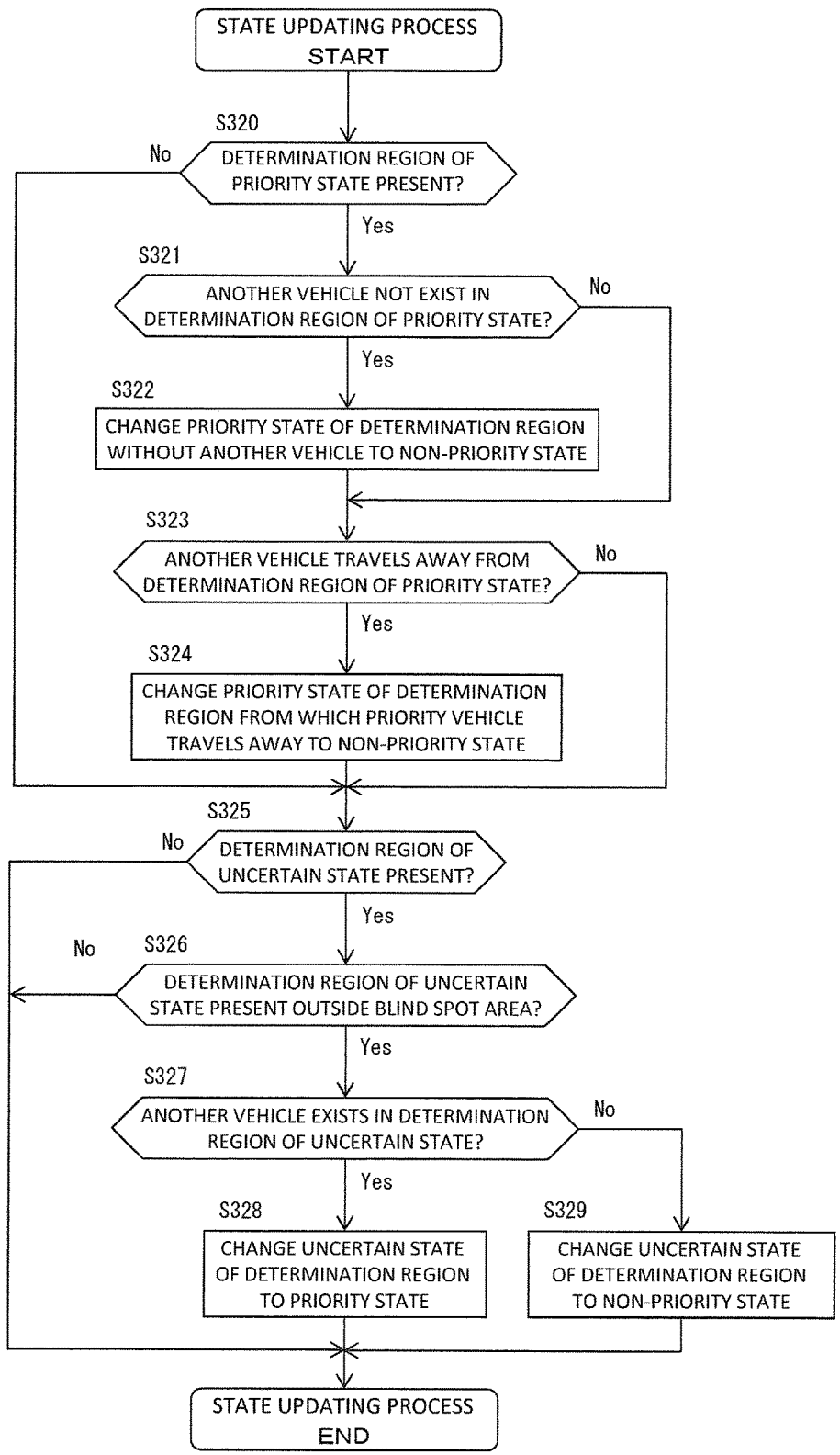
FIG. 17 is a flowchart illustrating a state updating process of step S303.

The process then proceeds to step S303 of FIG. 15 in which a state updating process is performed. FIG. 17 is a flowchart that illustrates the state updating process of step S303. As illustrated in FIG. 17, the priority state changing function operates first to determine whether a determination region of the priority state is present (step S320), and if a determination region of the priority state is present, the priority state changing function operates to determine whether another vehicle no longer exist in the determination region (step S321). If another vehicle no longer exists in a determination region of the priority state, the priority state changing function operates to change the priority state of the determination region to the non-priority state (step S322). Thereafter, or when another vehicle is determined to exist in the determination region (step S321), the priority state changing function operates to determine whether the priority vehicle travels away from the determination region of the priority state (step S323), and if the priority vehicle travels away from the determination region, the priority state changing function changes the priority state of the determination region to the non-priority state (step S324).

Step S324 is followed by step S325 in which the priority state changing function operates to determine whether a determination region of the uncertain state is present. If a determination region of the uncertain state is present, the process proceeds to step S326. If a determination region of the uncertain state is not present, this state updating process is ended.

In step S326, the priority state changing function operates to determine whether a determination region of the uncertain state is present outside the blind spot area. In the example illustrated in FIG. 12, for example, another vehicle V1 moves away, so that the determination region R2 of the uncertain state is present outside the blind spot area. In the example illustrated in FIG. 13, the own vehicle proceeds, so that the determination region R3 of the uncertain state is present outside the blind spot area. If a determination region of the uncertain state is present outside the blind spot area, the process proceeds to step S327. If a determination region of the uncertain state is not present outside the blind spot area, this state updating process is ended.

In step S327, because it is determined that a determination region of the uncertain state is present outside the blind spot area, the priority state changing function operates to determine whether another vehicle exists in the determination region of the uncertain state. If another vehicle exists in the determination region of the uncertain state, the process proceeds to step S328 in which the uncertain state of the determination region is changed to the priority state. If another vehicle does not exist in the determination region of the uncertain state, the process proceeds to step S329 in which the uncertain state of the determination region is changed to the non-priority state. In the example illustrated in FIG. 12, for example, the priority state changing function operates to change the uncertain state of the determination region R2 to the priority state because another vehicle V2 is detected within the determination region R2 which was in the uncertain state.

Figure 18:
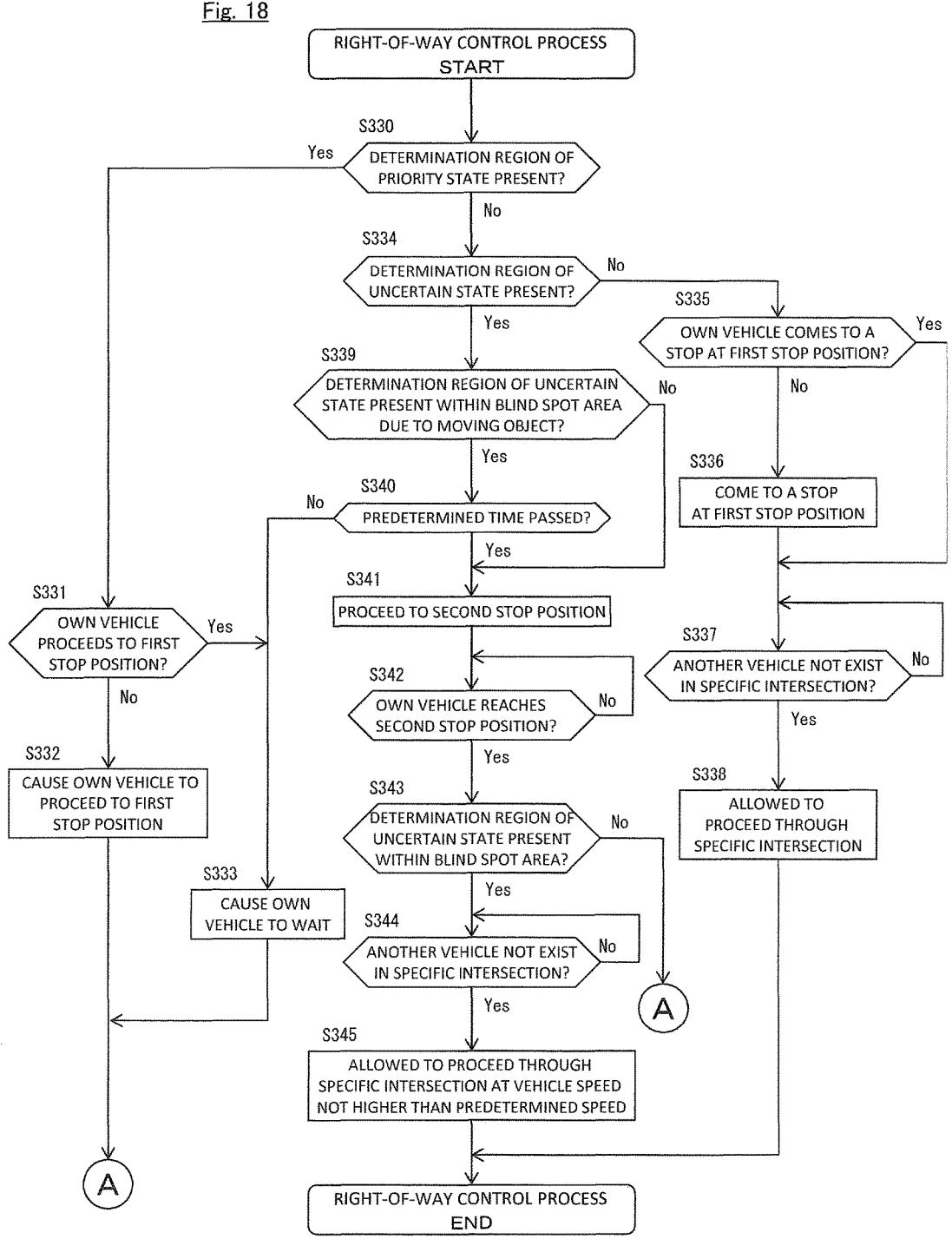
FIG. 18 is a flowchart illustrating a right-of-way control process of step S304.

The process then proceeds to step S304 of FIG. 15 in which a right-of-way control process is performed. FIG. 18 is a flowchart that illustrates the right-of-way control process of step S304. As illustrated in FIG. 18, in step S330, the right-of-way determination function operates first to determine whether a determination region of the priority state is present. If a determination region of the priority state is present, the right-of-way determination function operates to determine whether the own vehicle proceeds to the first stop position (step S331). If the own vehicle does not proceeds to the first stop position, the right-of-way determination function operates to cause the own vehicle to proceed to the first stop position (step S332). If the own vehicle proceeds to the first stop position, the right-of-way determination function operates to cause the own vehicle to wait at the first stop position (step S333). On the other hand, if a determination region of the priority state is not present, step S330 is followed by step S334.

In step S334, the right-of-way determination function operates to determine whether a determination region of the uncertain state is present. If a determination region of the uncertain state is not present, i.e., if the non-priority state is allocated to all of the determination regions, the process proceeds to step S335. In step S335, the right-of-way determination function operates to determine whether the own vehicle is brought to a stop at the first stop position. If the own vehicle is not brought to a stop at the first stop position, the own vehicle is brought to a stop at the first stop position in the subsequent step S336. Thereafter, if another vehicle does not exist in the specific intersection (step S337=Yes), the own vehicle is allowed to proceed through the specific intersection (step S338).

If, in step S334, it is determined that a determination region of the uncertain state is present, the process proceeds to step S339. In step S339, the right-of-way determination function operates to determine the reason that the determination region is in the uncertain state. If the reason of the uncertain state is because the determination region is present within a blind spot area due to a moving object, the process proceeds to step S340. If the reason of the uncertain state is because the determination region is present within a blind spot area due to a stationary object, the process proceeds to step S341. In the example illustrated in FIG. 11, for example, the determination region R2 of the uncertain state is present within the blind spot area O1 due to another vehicle V1 as a moving object, and therefore the process proceeds to step S340. The determination region R3 of the uncertain state is present within the blind spot area O2 due to the building B as a stationary object, and in this case the process proceeds to step S341. If, as illustrated in FIG. 11, there are a determination region of the uncertain state present within the blind spot area due to a moving object and a determination region of the uncertain state present within the blind spot area due to a stationary object, the process may proceed to step S340 in order to cause the own vehicle to wait for a time.

If a determination region of the uncertain state is present within a blind spot area due to a stationary object (step S339=No), the process proceeds to step S341 in which the right-of-way determination function operates to cause the own vehicle to proceed to the second stop position. After the own vehicle proceeds to the second stop position (step S342=Yes), the right-of-way determination function operates to determine whether a determination region of the uncertain state is no longer present within the blind spot area as a result that the own vehicle proceeds to the second stop position (step S343). If a determination region of the uncertain state is not present within the blind spot area, i.e., if all of determination regions of the uncertain state are present outside the blind spot area, the process proceeds to step S303 illustrated in FIG. 15, in which another vehicle is detected in the determination regions of the uncertain state, and the uncertain state of the determination regions is changed to the priority state or the non-priority state (steps S327 to S329). If, on the other hand, a determination region is present within the blind spot area even though the own vehicle is caused to proceed to the second stop position, the process proceeds to step S344. In step S344, the right-of-way determination function operates to determine whether another vehicle does not exist in the specific intersection. If another vehicle does not exist in the specific intersection (step S344=Yes), the right-of-way determination function operates to allow the own vehicle to proceed through the specific intersection at a vehicle speed that is not higher than a predetermined speed.

In the example illustrated in FIG. 11, for example, the determination region R3 of the uncertain state is present within the blind spot area O2 due to the stationary object B (step S339=No). In this case, as illustrated in FIG. 13, the own vehicle is caused to proceed to the second stop position (step S341), and the determination region R3 of the uncertain state can thereby be located outside the blind spot area O2 of the stationary object (step S343=No). Then, as illustrated in FIG. 13, another vehicle is detected within the determination region R3 located outside the blind spot area O2 (Step 5327=Yes), and the uncertain state of the determination region R3 is changed to the priority state (step S328). Thereafter, as illustrated in FIG. 14, the priority vehicle V3 travels away from the determination region R3 of the priority state (step S321=Yes or step S323=Yes), and the priority state of the determination region R3 is accordingly changed to the non-priority state (step S322 or step S324).

If the determination region of the uncertain state is present within a blind spot area due to a moving object (step S339=Yes), the process proceeds to step S340 in which it is determined whether a predetermined time passes after the determination region of the uncertain state is detected due to the moving object. If the predetermined time does not pass, the process proceeds to step S333 in which the own vehicle is caused to wait at the current position. Through this operation, until the predetermined time passes after the determination region of the uncertain state is detected due to the moving object, or until the moving object moves away, the own vehicle is caused to wait at the current position (step S333), and when the moving object moves away, the uncertain state of the determination region can be changed to the priority state or the non-priority state (step S327 to S329). On the other hand, if the predetermined time passes but the moving object still remains there (step S340=Yes), the own vehicle is caused to proceed to the second stop position (step S341). If the blind spot area occurs due to a moving object, the moving object moves away thereby to allow the determination region of the uncertain state to be located outside the blind spot area, but the moving object may not necessarily move away. Therefore, after the predetermined time passes, the own vehicle is caused to proceed to the second stop position. When the own vehicle reaches the second stop position (step S342=Yes), it is determined whether the determination region of the uncertain state is within the blind spot area (step S343), and if the determination region of the uncertain state is within the blind spot area, the process proceeds to step S344. Thereafter, whether another vehicle exists in the specific intersection is determined (step S344), and if another vehicle does not exist in the specific intersection, the process proceeds to step S345 in which the own vehicle is allowed to proceed through the specific intersection at a vehicle speed that is not higher than a predetermined speed.

In the example illustrated in FIG. 11, for example, the determination region R2 of the uncertain state is present within the blind spot area O2 due to another vehicle V1 (step S339=Yes). In this case, the vehicle waits at the current position until the predetermined time passes (step S340=No, followed by step S333). During this operation, the vehicle V1 may move away as illustrated in FIG. 12, and the determination region R2 of the uncertain state will be present outside the blind spot area (step S326=Yes). Then, another vehicle is detected within the determination region R2 of the uncertain state (step S327=Yes), and the uncertain state of the determination region R2 is changed to the priority state (step S328). Thereafter, as illustrated in FIG. 13, the priority vehicle V2 travels away from the determination region R2 of the priority state (step S321=Yes or step S323=Yes), and the priority state of the determination region R2 is accordingly changed to the non-priority state (step S322 or step S324).

Then, as illustrated in FIG. 14, if all of the determination regions are not in the priority state or the uncertain state (step S330=No, step S334=No), confirmation is made that another vehicle does not exist in the specific intersection (step S337), and the own vehicle is then allowed to proceed through the specific intersection (step S338).

As described above, according to the third embodiment, whether a determination region is present within a blind spot area is determined, and if a determination region is present within a blind spot area, traveling of the own vehicle is controlled so that the determination region comes to outside of the blind spot area. This allows detection of another vehicle within the determination region which is located outside the blind spot area, and whether the determination region is in the priority state or in the non-priority state can be appropriately determined.

In addition, according to the third embodiment, if the blind spot area occurs due to a stationary object, the own vehicle is caused to proceed by a predetermined distance, while if the blind spot area occurs due to a moving object, the own vehicle is caused to wait at a certain position. Through this operation, when the blind spot area occurs due to a stationary object, the own vehicle proceeds by a predetermined distance to thereby allow the determination region to come to outside of the blind spot area. Therefore, it can be appropriately determined whether the determination region of the uncertain state is in the priority state or in the non-priority state. When the blind spot area occurs due to a moving object, the own vehicle waits at a certain position until the moving object moves away. Therefore, it can be appropriately determined whether the determination region of the uncertain state is in the priority state or in the non-priority state.

Moreover, according to the third embodiment, when a blind spot area occurs due to a moving object and a determination region is present within the blind spot area even after a predetermined time passes from the time when the own vehicle is caused to wait, the own vehicle is brought to a stop at the second stop position and thereafter allowed to proceed into the specific intersection. Through this operation, when the moving object does not moves away, it is possible to effectively prevent a situation that the own vehicle cannot proceed through the specific intersection.

Furthermore, according to the third embodiment, when a blind spot area occurs due to a moving object or due to a stationary object and a determination region is present within the blind spot area even after the own vehicle is caused to proceed to the second stop position, the own vehicle is allowed to proceed into the specific intersection at a vehicle speed that is not higher than a predetermined speed, provided that a determination region of the priority state is not present and another vehicle does not exist in the specific intersection. Through this operation, it is possible to effectively prevent a situation that the own vehicle cannot proceed into the specific intersection.

In addition, according to the third embodiment, when a determination region is present within a blind spot area due to a moving object and another determination region is present within a blind spot area due to a stationary object, the own vehicle is caused to wait for a predetermined time as in the case in which a determination region is present only within a blind spot area due to a moving object. This allows the own vehicle to safely proceed through the specific intersection.

Moreover, according to the third embodiment, all of the determination regions are initially set to a default configuration of the uncertain state. Therefore, when it is uncertain whether another vehicle exists in the determination regions, the own vehicle can be caused to wait for a time for standby. This allows the own vehicle to safely proceed through the specific intersection.

Embodiments heretofore explained are described to facilitate understanding of the present invention and are not described to limit the present invention. Therefore, it is intended that the elements disclosed in the above embodiments include all design changes and equivalents to fall within the technical scope of the present invention.

For example, the above-described third embodiment may be modified such that, when another vehicle proceeds into the specific intersection from a blind spot area, the vehicle proceeding into the specific intersection is determined as a priority vehicle, and the non-priority state is allocated to the determination region from which the priority vehicle travels away. This allows appropriate determination whether a determination region is in the priority state or in the non-priority state even when it cannot be determined whether another vehicle exists in the determination region which is present within a blind spot area.

In the above-described embodiments, the present invention has been described with reference to a 4-way specific intersection (so-called 4-way stop intersection), but the present invention can also be applied to a 3-way intersection or 5 or more-way intersection.

In the above-described embodiments, the vehicle controller 120 represents a first detector of the present invention, and the ambient detecting sensor 110 represents a second detector of the present invention.

DESCRIPTION OF REFERENCE NUMERALS

100 . . . Traveling control apparatus
110 . . . Ambient detecting sensor
120 . . . Vehicle controller
130 . . . Map database
140 . . . Presentation device
150 . . . Drive control device
160 . . . Control device

What is claimed is:

1. A control method for a vehicle, the vehicle comprising:
a first detector configured to detect a state of one vehicle;
a second detector configured to detect a situation around the one vehicle;
a drive control device; and
a controller in communication with the drive control device, the method comprising:
determining with the controller based on a map database a specific intersection, the specific intersection being an intersection into which vehicles are permitted to proceed in an order that the vehicles arrive at the intersection
setting a determination region within a lane other than a lane in which the one vehicle travels, the determination region being set at a near side when proceeding into the specific intersection;
receiving notification of detection of another vehicle in the determination region from the second detector;
determining whether the one vehicle reaches a certain position at the near side of the specific intersection;
allocating a priority state to the determination region in which the other vehicle exists when the one vehicle reaches the certain position and allocating a non-priority state to the determination region in which the other vehicle does not exist when the one vehicle reaches the certain position;
changing the priority state of the determination region from the priority state to the non-priority state when the other vehicle no longer exists in the determination region; and
providing instructions to the drive control device to allow the one vehicle to proceed into the specific intersection when the determination region of the priority state is not present.

2. The control method according to claim 1, wherein, when the determination region of the priority state is present, the one vehicle is brought to a stop by the drive control device at a first stop position that is located at the near side when proceeding into the specific intersection and separate from the specific intersection by a predetermined distance.

3. The control method according to claim 1, wherein, when the determination region of the priority state is not present, the one vehicle is brought to a stop at a first stop position that is located at the near side when proceeding into the specific intersection and separate from the specific intersection by a predetermined distance, and thereafter allowed to proceed into the specific intersection.

4. The control method according to claim 1, wherein the detecting the other vehicle in the determination region includes detecting the other vehicle only in the determination region of the priority state among all of the determination regions.

5. The control method according to claim 1, wherein a length of the determination region in a traveling direction of the other vehicle is set equal to or shorter than a length of a typical vehicle.

6. The control method according to claim 1, wherein a distance from the specific intersection to the certain position at the near side of the specific intersection is approximately equal to a distance from the specific intersection to a position at which the other vehicle arrives at the determination region.

7. The control method according to claim 1, wherein the other vehicle existing in the determination region of the priority state is set as a priority vehicle, and when the priority vehicle travels away from the determination region of the priority state, the priority state of the determination region is changed to the non-priority state.

8. The control method according to claim 1, further comprising:
detecting a blind spot area that is an area of blind spots from the one vehicle;
allocating an uncertain state to the determination region that is present within the blind spot area; and
controlling the one vehicle to proceed or wait when the determination region of the uncertain state is present.

9. The control method according to claim 8, wherein the one vehicle is caused to proceed when the blind spot area occurs due to a stationary object, and the one vehicle is caused to wait when the blind spot area occurs due to a moving object.

10. The control method according to claim 8, wherein
the one vehicle is caused to wait for a predetermined time when the blind spot area occurs due to a moving object, and
the one vehicle is caused to proceed when the determination region is present within the blind spot area after the predetermined time passes.

11. The control method according to claim 8, wherein
the one vehicle is caused to wait when the determination region is present within the blind spot area due to a moving object and another determination region is present within the blind spot area due to a stationary object.

12. The control method according to claim 8, wherein
the uncertain state is initially allocated to the determination region before detecting the other vehicle within the determination region.

13. The control method according to claim 8, wherein, when the determination region of the uncertain state is present even after the one vehicle is caused to proceed by a predetermined distance, the one vehicle is allowed to proceed into the specific intersection at a vehicle speed that is not higher than a predetermined speed, provided that the determination region of the priority state is not present and another vehicle does not exist in the specific intersection.

14. A traveling control device for a device for a vehicle comprising:
   a first detector configured to detect a traveling state of one vehicle;
   a second detector configured to detect a situation around the one vehicle;
   a drive control device to drive the vehicle; and
   a controller in communication with the drive control device configured to determine a specific intersection based on a map database and determine whether to allow the one vehicle to proceed into the specific intersection,
the specific intersection being an intersection into which vehicles are permitted to proceed in an order that the vehicles arrive at the intersection,
the controller unit being further configured to:
   set a determination region within a lane other than a lane in which the one vehicle travels, the determination region being set at a near side when proceeding into the specific intersection;
   receive notice of detection of another vehicle in the determination region from the second detector;
   determine whether the one vehicle reaches a certain position at the near side of the specific intersection;
   allocate a priority state to the determination region in which the other vehicle exists when the one vehicle reaches the certain position and allocate a non-priority state to the determination region in which the other vehicle does not exist when the one vehicle reaches the certain position;
   change the priority state of the determination region from the priority state to the non-priority state when the other vehicle no longer exists in the determination region; and
   provide instructions to the drive control device to allow the one vehicle to proceed into the specific intersection when the determination region of the priority state is not present.

* * * * *